(12) United States Patent
Yoshida et al.

(10) Patent No.: US 8,882,337 B2
(45) Date of Patent: Nov. 11, 2014

(54) CLOSED KNEADING MACHINE AND KNEADING ROTOR

(75) Inventors: Norifumi Yoshida, Takasago (JP); Masaaki Uemura, Takasago (JP); Hiromi Nakano, Takasago (JP); Katsunobu Hagiwara, Takasago (JP); Kimio Inoue, Takasago (JP); Mika Nishida, Kobe (JP); Kazuhisa Fukutani, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 651 days.

(21) Appl. No.: 13/259,954

(22) PCT Filed: Mar. 12, 2010

(86) PCT No.: PCT/JP2010/001789
§ 371 (c)(1),
(2), (4) Date: Sep. 23, 2011

(87) PCT Pub. No.: WO2010/119610
PCT Pub. Date: Oct. 21, 2010

(65) Prior Publication Data
US 2012/0014206 A1 Jan. 19, 2012

(30) Foreign Application Priority Data
Apr. 15, 2009 (JP) ................. 2009-098660

(51) Int. Cl.
*B29B 7/18* (2006.01)
*B29B 7/24* (2006.01)
*B29B 7/26* (2006.01)

(52) U.S. Cl.
CPC .............. *B29B 7/186* (2013.01); *B29B 7/246* (2013.01); *B29B 7/263* (2013.01)
USPC ........................................... 366/97

(58) Field of Classification Search
USPC ............ 366/76.1, 76.2, 76.93, 76.7, 76.8, 77, 366/96, 97, 142, 189, 192, 194–196; 425/204, 208, 209
See application file for complete search history.

(56) References Cited

U.S. PATENT DOCUMENTS
1,936,248 A * 11/1933 Stromer et al. ............... 366/91
4,058,297 A * 11/1977 Seufert ......................... 366/81
(Continued)

FOREIGN PATENT DOCUMENTS
CN 101153470 A 4/2008
EP 729816 A1 * 9/1996 ............... B29B 7/18
(Continued)

OTHER PUBLICATIONS
International Search Report Issued Jun. 8, 2010 in PCT/JP10/001789 Filed Mar. 12, 2010.
(Continued)

*Primary Examiner* — Charles Cooley
(74) *Attorney, Agent, or Firm* — Oblon, Spivak, McClelland, Maier & Neustadt, L.L.P.

(57) ABSTRACT

A kneading rotor, in which the length L4 of a long blade in the direction of rotation of a rotor section is greater than one half of the total length L5 of a rotor section main body in the direction of rotation, and the long blades are arranged in such a manner that, in a case where a pair of the rotor sections are arranged mutually in parallel inside the chamber of the closed kneading machine and are rotated in mutually opposite directions, an end section on the rearward side in the direction of rotation of the rotor section, of the long blade of one of the rotor sections, and an end section on the forward side in the direction of rotation of the rotor section, of the long blade of the other one of the rotor sections, alternately repeat mutually an approaching action and a separating action, and in the state of approach, the end section on the forward side and the end section on the rearward side oppose each other in the direction of rotation of the rotor sections on a line which links the respective central axes of the pair of rotor sections, in one cross-section perpendicular to the axial direction of the rotor section.

6 Claims, 20 Drawing Sheets

(56) References Cited

U.S. PATENT DOCUMENTS

| | | | |
|---|---|---|---|
| 4,084,263 A * | 4/1978 | Millauer | 366/84 |
| 4,234,259 A * | 11/1980 | Wiedmann et al. | 366/81 |
| 4,284,358 A * | 8/1981 | Sato et al. | 366/97 |
| 4,300,838 A * | 11/1981 | Sato et al. | 366/97 |
| 4,456,381 A * | 6/1984 | Inoue et al. | 366/97 |
| 4,714,350 A * | 12/1987 | Nortey | 366/84 |
| 4,718,771 A * | 1/1988 | Asai et al. | 366/97 |
| 4,744,668 A * | 5/1988 | Nortey | 366/76.7 |
| 4,834,543 A * | 5/1989 | Nortey | 366/97 |
| 4,893,936 A * | 1/1990 | Borzenski et al. | 366/76.7 |
| 5,044,760 A * | 9/1991 | Asai | 366/97 |
| 5,297,935 A * | 3/1994 | Passoni | 416/183 |
| 5,520,455 A * | 5/1996 | Yamada et al. | 366/97 |
| 5,672,006 A * | 9/1997 | Hanada et al. | 366/84 |
| 5,791,776 A * | 8/1998 | Takakura et al. | 366/84 |
| 5,791,799 A | 8/1998 | Oehlhorn | |
| 5,984,516 A * | 11/1999 | Inoue et al. | 366/97 |
| 6,402,360 B1 * | 6/2002 | Nortey | 366/85 |
| 6,494,607 B2 * | 12/2002 | Valsamis et al. | 366/84 |
| 6,811,295 B2 * | 11/2004 | Koro et al. | 366/97 |
| 6,913,379 B2 * | 7/2005 | Otsuka et al. | 366/76.7 |
| 7,556,420 B2 * | 7/2009 | Limper et al. | 366/84 |
| 7,854,542 B2 * | 12/2010 | Inoue et al. | 366/97 |
| 2001/0036123 A1 * | 11/2001 | Koro et al. | 366/84 |
| 2002/0163852 A1 * | 11/2002 | Valsamis et al. | 366/84 |
| 2006/0098527 A1 * | 5/2006 | Limper et al. | 366/97 |
| 2006/0104154 A1 * | 5/2006 | Inoue et al. | 366/96 |
| 2008/0078853 A1 | 4/2008 | Sugino et al. | |
| 2011/0222364 A1 | 9/2011 | Yoshida et al. | |

FOREIGN PATENT DOCUMENTS

| | | | |
|---|---|---|---|
| JP | 06 285349 | 10/1994 | |
| JP | 09216224 A * | 8/1997 | B29B 7/18 |
| JP | 11188249 A * | 7/1999 | B01F 7/08 |
| JP | 2002 011336 | 1/2002 | |
| JP | 2006 218691 | 8/2006 | |
| TW | 200505650 | 6/1993 | |
| TW | 466131 B | 12/2001 | |
| WO | WO 00/73033 | 12/2000 | |

OTHER PUBLICATIONS

International Preliminary Report on Patentability Issued on Nov. 15, 2011 in PCT/JP10/01789 filed Mar. 12, 2010.

Taiwanese Office Action Issued Jul. 24, 2012 in Patent Application No. 099107812 (with English summary).

Extended European Search Report issued Jul. 16, 2013 in Patent Application No. 13167207.3 submitting English translation only.

Extended European Search Report issued Jul. 18, 2013 in Patent Application No. 10764197.9 submitting English translation only.

* cited by examiner

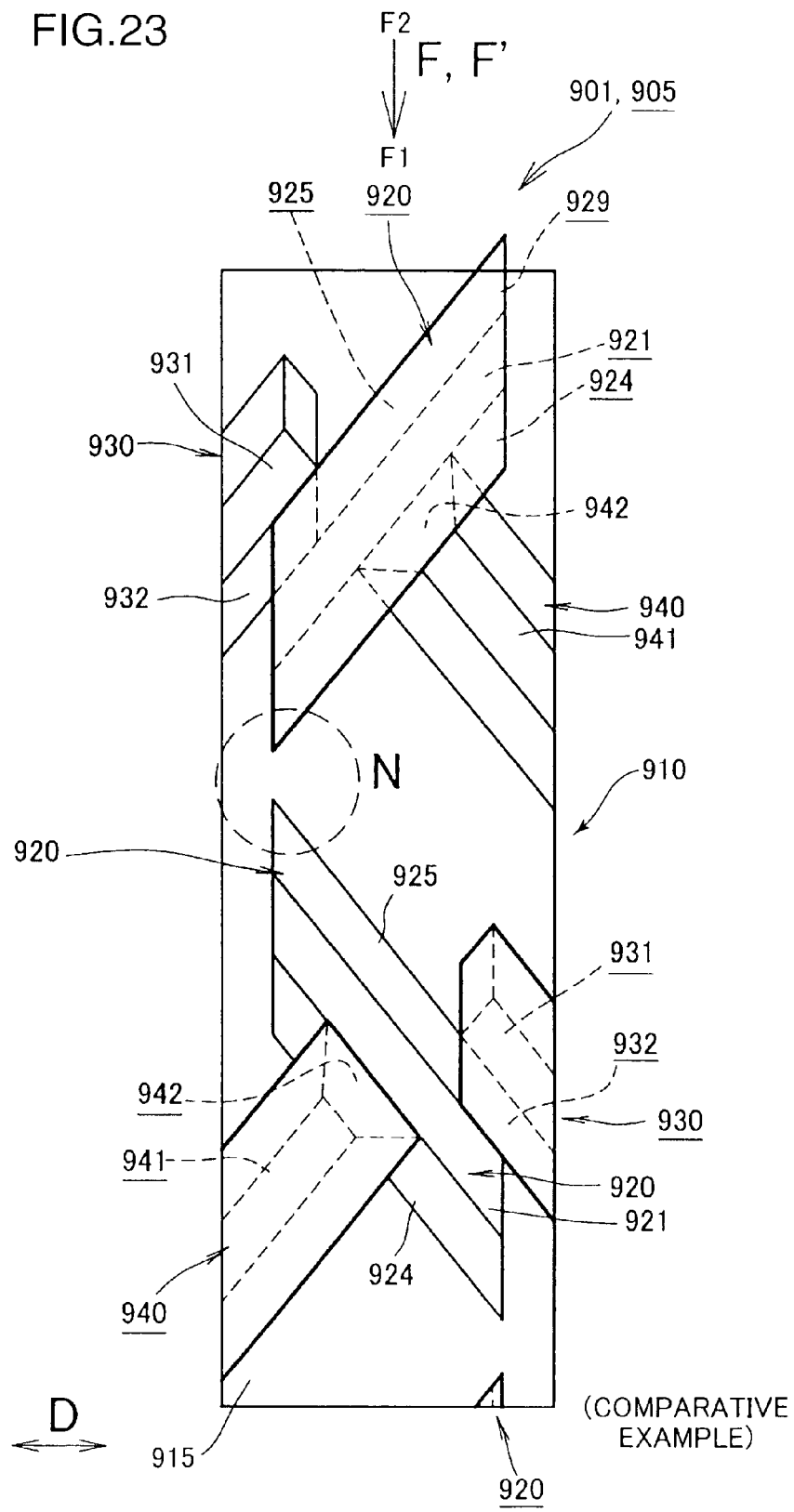
FIG.23 (COMPARATIVE EXAMPLE)

CLOSED KNEADING MACHINE AND KNEADING ROTOR

TECHNICAL FIELD

The present invention relates to a closed kneading machine and a kneading rotor for same.

BACKGROUND ART

Patent Document 1 discloses a conventional intermeshing type of kneading rotor. In the kneading rotor disclosed in Patent Document 1, the ratio l/L between the length l of the long blade of the rotor and the length L of the rotor in the axial direction is specified as 0.6 or greater, and furthermore, the ratio a/L between the length a in the axial direction of the portion of the rotor between the end of the long blade and the end of the rotor in the axial direction, and the aforementioned length L is specified as 0.2 or lower. Therefore, it is possible to knead a material efficiently by means of the long blade. Furthermore, since the flow of material can be made to branch off from both ends of the long blade, kneading non-uniformities of the material are eliminated.

In a closed kneading machine, the material fluidity properties (distribution performance) and the material shearing properties (scattering performance) are both important factors. However, in a conventional kneading rotor, if the screw angle of the long blade is increased, then although the fluidity properties (distribution performance) are raised, the shearing properties (scattering performance) declines.

Patent Document 1: Japanese Patent No. 2803960

DISCLOSURE OF THE INVENTION

An object of the present invention is to provide a closed kneading machine and a kneading rotor which resolve the problems described above.

It is a further object of the present invention to provide a closed kneading machine and a kneading rotor having both excellent fluidity properties and excellent shearing properties.

The kneading rotor according to one aspect of the present invention is a kneading rotor of an intermeshing type used in a closed kneading machine having a casing inside which a chamber is provided, comprising a rotor section which is provided in the chamber, wherein the rotor section has a rotor section main body of a round cylindrical shape, and one long blade and two short blades provided on the surface of the rotor section main body; the length L4 of the long blade in the direction of rotation of the rotor section is greater than one half of the total length L5 of the rotor section main body in the direction of rotation; the ratio (L1/L2) between the length L1 of the long blade in the axial direction of the rotor section and the total length L2 of the rotor section main body in the axial direction is equal to or greater than 0.6, and less than 1, and the ratio (x/L2) between the distance x in the axial direction from one end of the long blade to the end of the rotor section main body and the total length L2 of the rotor section main body in the axial direction is greater than 0 and equal to or less than 0.2; in a case where a pair of the rotor sections are arranged mutually in parallel inside the chamber of the closed kneading machine and are rotated in mutually opposite directions, the two short blades are arranged in such a manner that the two short blades of one of the rotor sections alternately repeat an approaching action and a separating action, in the direction of rotation of the rotor section, with respect to the long blade of the other one of the rotor sections, and in the state of approach, the long blade of the other one of the rotor sections is sandwiched between the two short blades of the one of the rotor sections in the axial direction; and in a case where a pair of the rotor sections are arranged mutually in parallel inside the chamber of the closed kneading machine and are rotated in mutually opposite directions, the long blades are arranged in such a manner that an end section on the rearward side in the direction of rotation of the rotor section, of the long blade of one of the rotor sections, and an end section on the forward side in the direction of rotation of the rotor section, of the long blade of the other one of the rotor sections, alternately repeat mutually an approaching action and a separating action, and in the state of approach, the end section on the forward side and the end section on the rearward side oppose each other in the direction of rotation of the rotor sections on a line which links the respective central axes of the pair of rotor sections, in one cross-section perpendicular to the axial direction.

The kneading rotor according to a further aspect of the present invention is a kneading rotor of an intermeshing type used in a closed kneading machine having a casing inside which a chamber is provided, comprising a rotor section which is provided in the chamber, wherein the rotor section has a rotor section main body of a round cylindrical shape, and one long blade and two short blades provided on the surface of the rotor section main body; the length L4 of the long blade in the direction of rotation of the rotor section is greater than one half of the total length L5 of the rotor section main body in the direction of rotation; the ratio (L1/L2) between the length L1 of the long blade in the axial direction of the rotor section and the total length L2 of the rotor section main body in the axial direction is equal to or greater than 0.6, and less than 1, and the ratio (x/L2) between the distance x in the axial direction from one end of the long blade to the end of the rotor section main body and the total length L2 of the rotor section main body in the axial direction is greater than 0 and equal to or less than 0.2; in a case where a pair of the rotor sections are arranged mutually in parallel inside the chamber of the closed kneading machine and are rotated in mutually opposite directions, the two short blades are arranged in such a manner that the two short blades of one of the rotor sections alternately repeat an approaching action and a separating action in the direction of rotation of the rotor section with respect to the long blade of the other one of the rotor sections, and in the state of approach, the long blade of the other one of the rotor sections is sandwiched between the two short blades of the one of the rotor sections in the axial direction; and in a case where a pair of the rotor sections are arranged mutually in parallel inside the chamber of the closed kneading machine and are rotated in mutually opposite directions, the long blades are arranged in such a manner that an end section on the rearward side in the direction of rotation of the rotor section, of the long blade of one of the rotor sections, and an end section on the forward side in the direction of rotation of the rotor section, of the long blade of the other one of the rotor sections, alternately repeat mutually an approaching action and a separating action, and in the state of approach, the distance D1 between the central axis of one of the rotor sections and the front end of the long blade of that rotor section, the distance D2 between the central axis of the other one of the rotor sections and the front end of the long blade of that rotor section, and the distance D3 between the respective central axes of the pair of rotor sections satisfy the relationship D1+D2>D3 in the direction linking the respective central axes of the pair of rotor sections, in one cross-section perpendicular to the axial direction.

BRIEF DESCRIPTION OF THE DRAWINGS

FIG. 23 is a superimposed projected diagram of the kneading sections of a pair of kneading rotors relating to a comparison example.

MODE FOR CARRYING OUT THE INVENTION

General Composition

Figure 1:
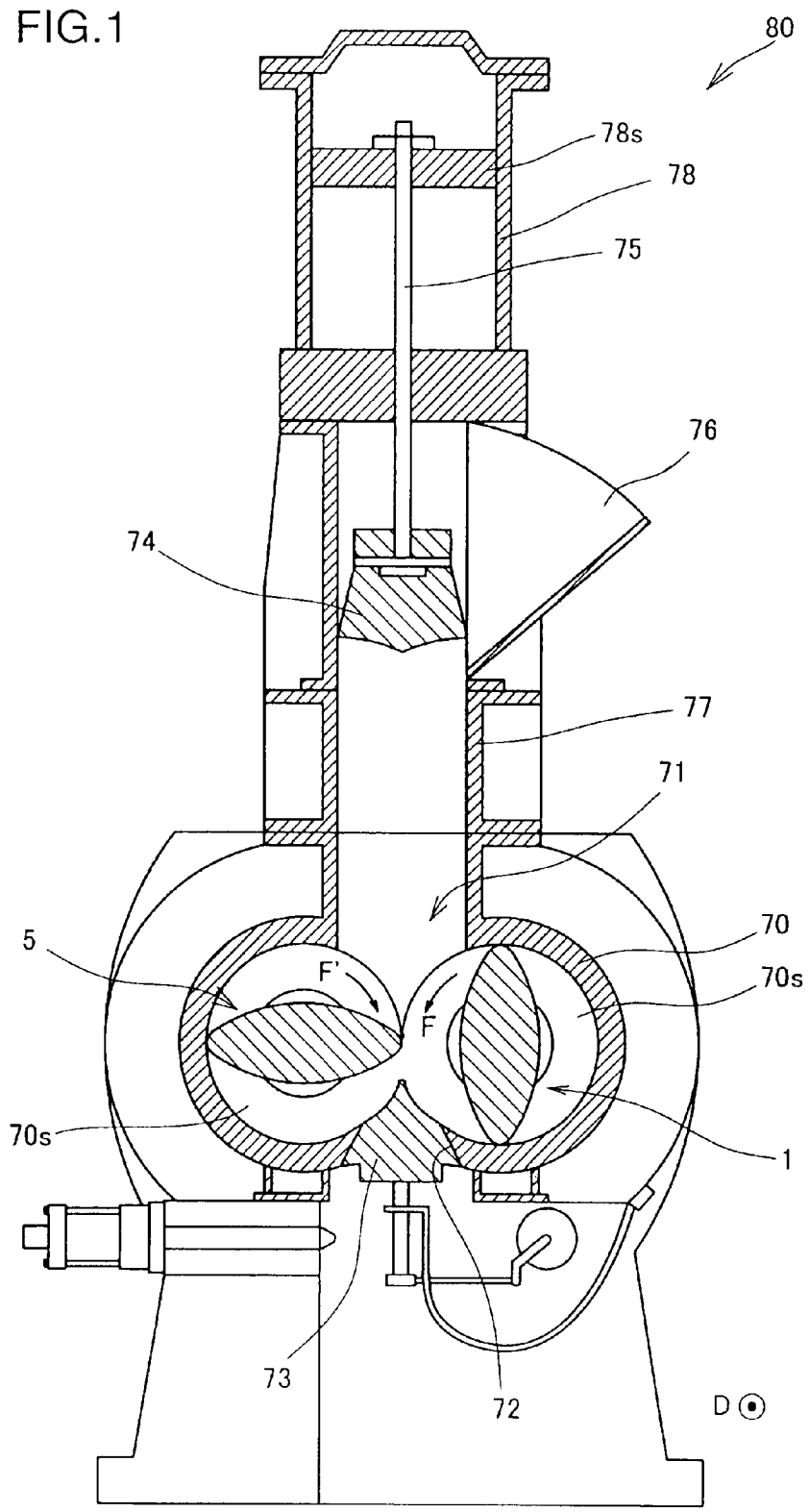
FIG. 1 is a schematic cross-sectional drawing of a closed kneading machine relating to one embodiment of the present invention.

Below, one embodiment of the present invention will be described with reference to the drawings.

A closed kneading machine 80 is a biaxial batch mixer, which is used to knead rubber starting material, for example. The closed kneading machine 80 comprises a casing 70, a drop door 73, a pair of kneading rotors (a first kneading rotor 1 and a second kneading rotor 5), a material supply tube 77, a pneumatic pressure cylinder 78, and a floating weight 74.

The casing 70 is a main body section of the closed kneading machine 80 and is made of metal. The casing 70 is supported by a metal support platform. Two chambers (kneading chambers) 70s are formed inside the casing 70. The respective chambers 70s are formed in a hollow shape having an approximately circular cross section.

A material supply port 71 for supplying material to be kneaded to the interior of the chambers 70s is provided in the upper portion of the casing 70, and a material discharge port 72 for discharging material which has been kneaded inside the chambers 70s is provided in the lower portion of the casing 70. The material discharge port 72 is formed so as to extend along the axial direction D of the kneading rotor (a direction perpendicular to the plane of the drawing in FIG. 1, and the direction indicated by arrow D in other drawings). Inside the casing 70, the material supply port 71, the two chambers 70s and the material discharge port 72 are mutually connected.

A pair of kneading rotors made of metal material are accommodated in the two chambers 70s. The pair of kneading rotors are respectively rotated in mutually opposite directions (see the directions of arrows F, F' in FIG. 1) by applying a drive force from a motor (not illustrated).

The drop door 73 is made of metal and functions as a lid member for closing the material discharge port 72 of the casing 70. The drop door 73 is provided so as to be movable in the upward/downward direction. The drop door 73 is lowered when the material discharge port 72 is to be opened, and the drop door 73 is raised when the material discharge port 72 is to be closed.

The material supply tube 77 extends in the upward/downward direction above the casing 70, and the internal space of the material supply tube 77 is connected to the material supply port 71. Furthermore, a hopper 76 is provided in the material supply tube 77. The floating weight 74 is disposed inside the material supply tube 77. The floating weight 74 is fixed to the lower end of a piston rod 75 and is movable in the upward/downward direction together with the piston rod 75.

A pneumatic pressure cylinder 78 is provided above the material supply tube 77. A piston 78s is provided inside the pneumatic pressure cylinder 78, and the piston 78s is fixed to the upper end of the piston rod 75. When the floating weight 74 descends due to the action of the pneumatic pressure cylinder 78, material to be kneaded which has been supplied from the hopper 76 is supplied to the interior of the chamber 70s.

(Kneading Rotors)

Next, the pair of kneading rotors (first kneading rotor 1 and second kneading rotor 5) will be described. The pair of kneading rotors are accommodated in the chambers (kneading chamber 70s) inside the casing 70 and are disposed mutually in parallel. Furthermore, the pair of kneading rotors are intermeshing type rotors.

The respective kneading rotors rotate in mutually different directions. More specifically, the first kneading rotor 1 rotates in the direction of rotation F (see direction of arrow F in the drawings) and the second kneading rotor 5 rotates in the direction of rotation F' (see direction of arrow F' in the drawings).

Figure 2:
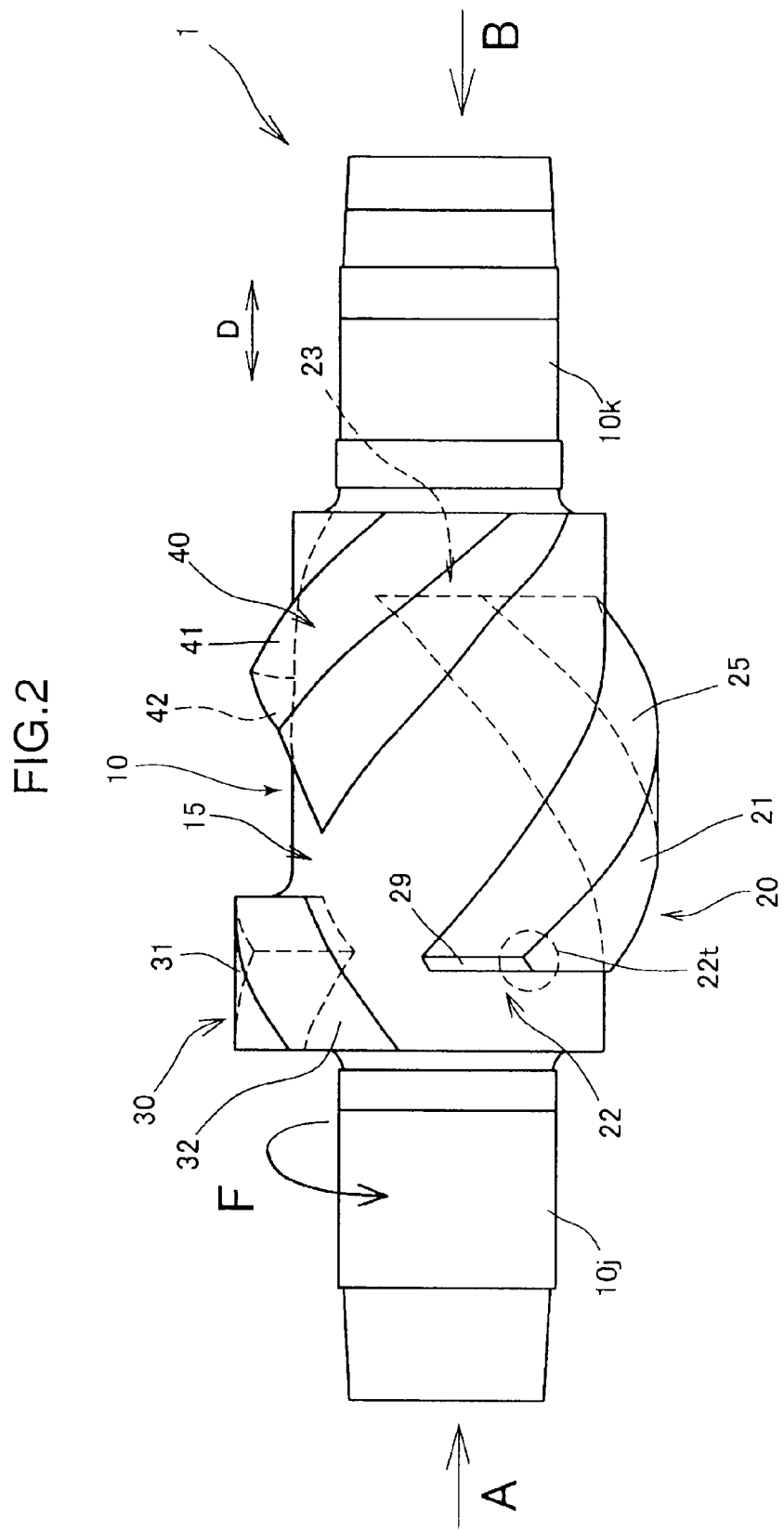
FIG. 2 is a right-side diagram of a kneading rotor.
Figure 3:
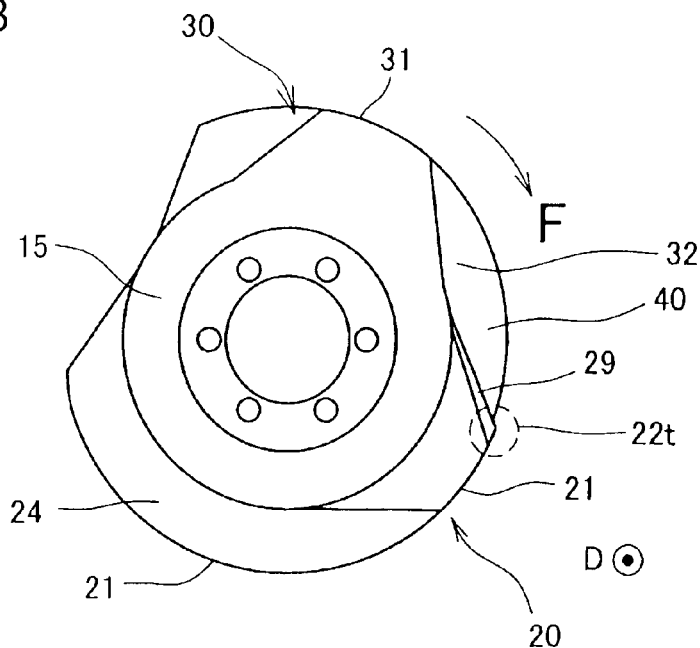
FIG. 3 is a front side diagram of a kneading rotor (a diagram in the direction of arrow A of the kneading rotor shown in FIG. 2).
Figure 4:
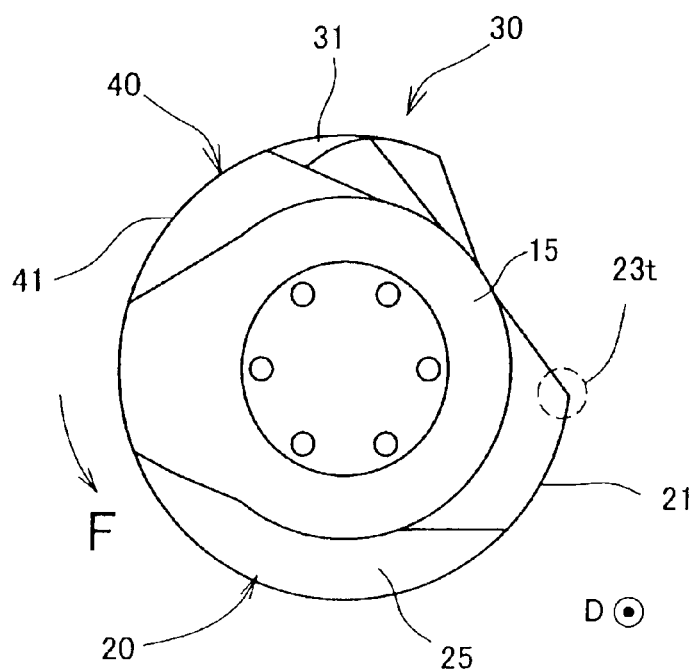
FIG. 4 is a rear side diagram of a kneading rotor (a diagram in the direction of arrow B of the kneading rotor shown in FIG. 2).
Figure 9:
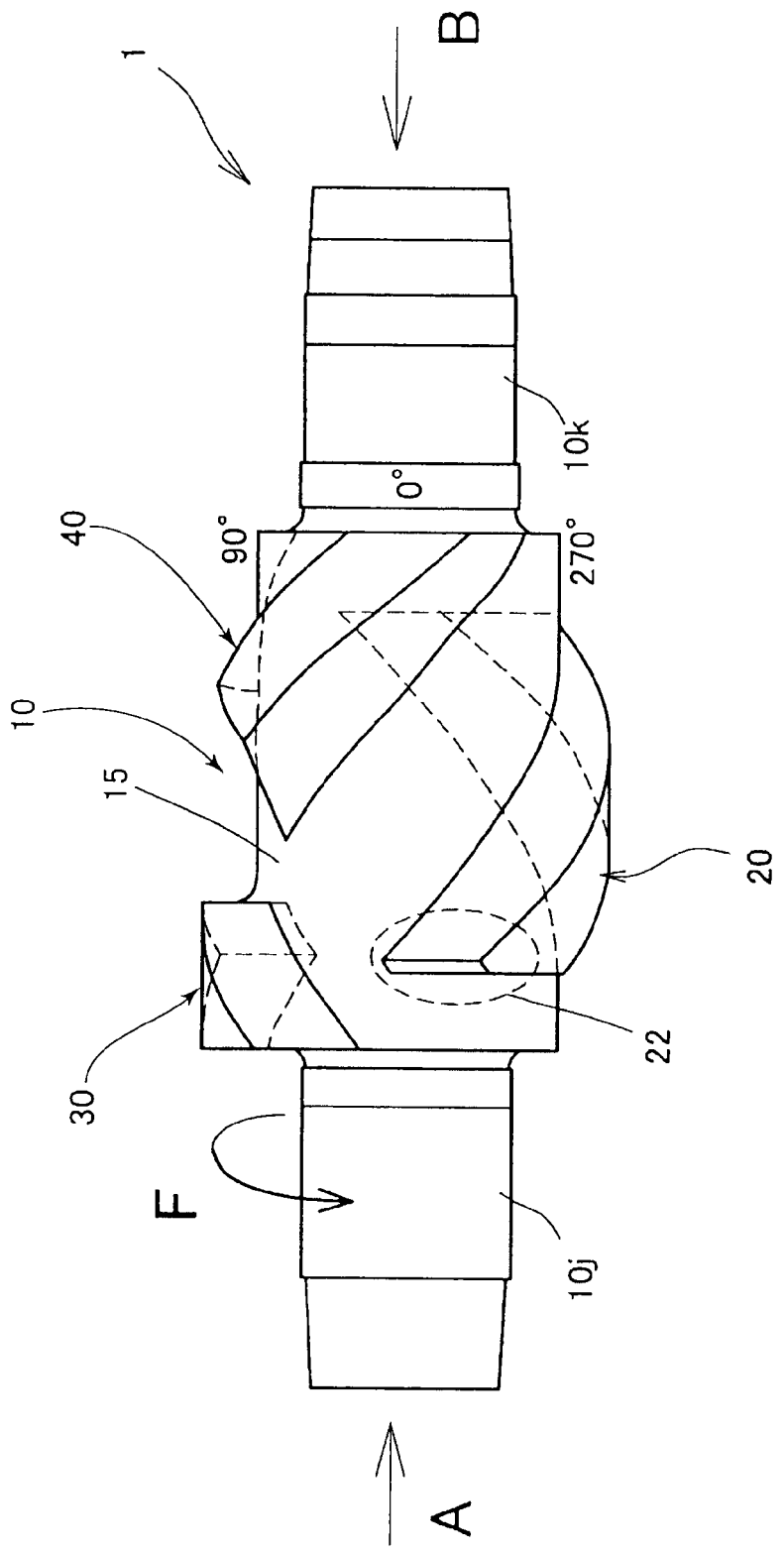
FIG. 9 is a right-side diagram of a first kneading rotor.

The first kneading rotor 1 comprises a rotor section 10, a rotating shaft 10j, and a rotating shaft 10k (see FIG. 2 and FIG. 9). The rotor section 10 is installed on the rotating shaft 10j and the rotating shaft 10k, and the rotor section 10, the rotating shaft 10j and the rotating shaft 10k are disposed coaxially. One rotating shaft 10j extends so as to project from one end of the rotor section 10 in the axial direction, and the other rotating shaft 10k extends so as to project from the other end of the rotor section 10 in the axial direction. The rotor section 10, the rotating shaft 10j and the rotating shaft 10k are made of metal. The second kneading rotor 5 comprises a rotor section 10, a rotating shaft 10j and a rotating shaft 10k, similarly to the first kneading rotor 1 (see FIG. 10).

Figure 10:
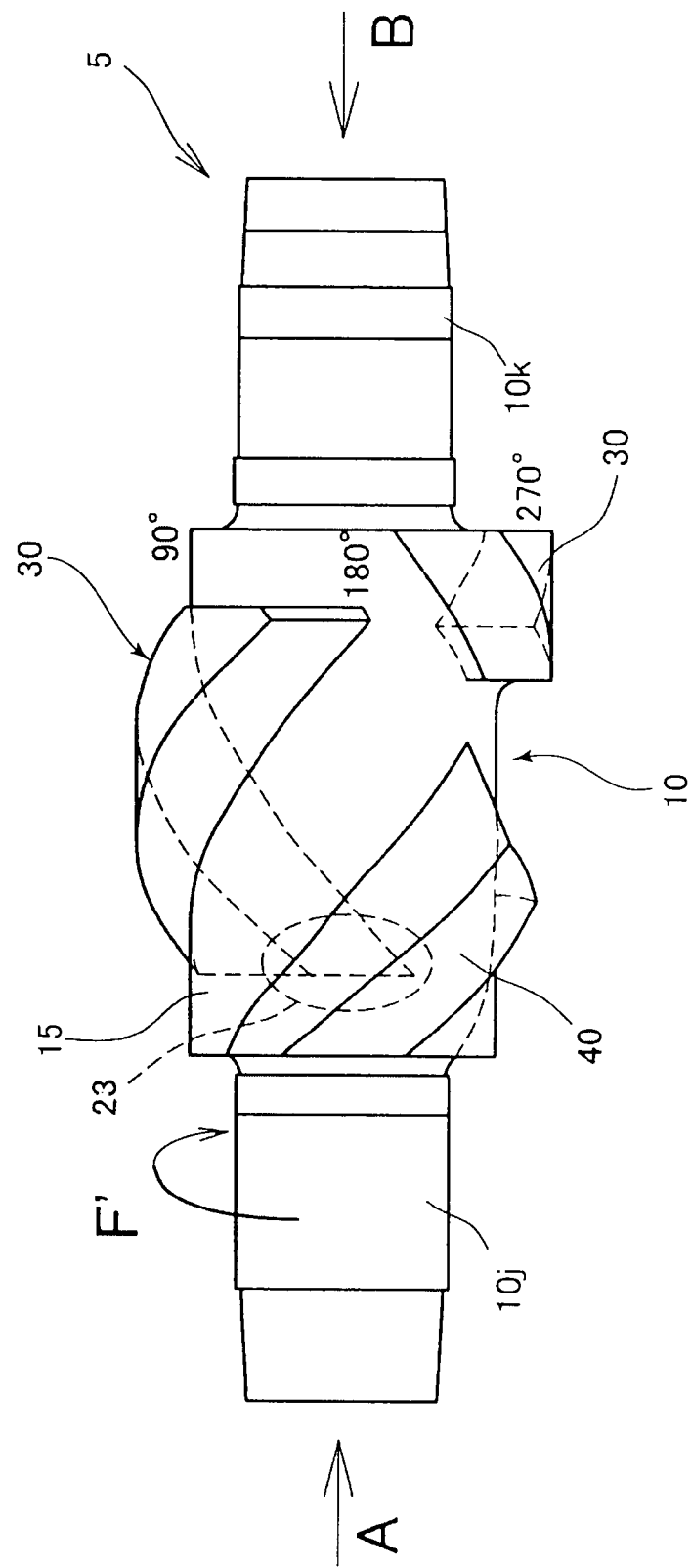
FIG. 10 is a right-side diagram of a second kneading rotor.

In the second kneading rotor 5, the rotor section 10 is installed in an opposite arrangement with respect to the rotating shaft 10j and the rotating shaft 10k compared to the arrangement of the rotor section 10 with respect to the rotating shaft 10j and the rotating shaft 10k in the first kneading rotor 1 (see FIG. 9 and FIG. 10). More specifically, in the first kneading rotor 1, the rotor section 10 is installed with respect to the rotating shaft 10j and the rotating shaft 10k in such a manner that a medium blade 40, which is described hereinafter, is disposed on the side of the rotating shaft 10k, and a short blade 30, which is described hereinafter, is disposed on the side of the rotating shaft 10j, whereas in the second kneading rotor 5, the rotor section 10 is installed with respect to the rotating shaft 10j and the rotating shaft 10k in such a manner that a medium blade 40, which is described hereinafter, is disposed on the side of the rotating shaft 10j, and a short blade 30, which is described hereinafter, is disposed on the side of the rotating shaft 10k. Apart from these arrangement directions, the structures of the rotor section 10, the rotating shaft 10j and the rotating shaft 10k in the second kneading rotor 5 are the same as the structures of the rotor section 10, the rotating shaft 10j and the rotating shaft 10k of the first kneading rotor 1. The description given below centers principally on the first kneading rotor 1, and description of the second kneading rotor 5 is omitted. In considering the second kneading rotor 5, reference to "direction of rotation F" in the description of the first kneading rotor 1 should be rewritten as "direction of rotation F'".

The rotor section 10 is a section disposed inside the chambers 70s which kneads the material to be kneaded inside the chamber 70s. The rotor section 10 has a round bar-shaped rotor section main body 15 installed coaxially with the rotating shaft 10j and the rotating shaft 10k, and three kneading blades, namely, a long blade 20 and two short blades (a short blade 30 and a medium blade 40). The long blade 20 and the two short blades (the short blade 30 and the medium blade 40) are provided on the surface (circumferential surface) of the rotor section main body 15. By means of these kneading blades, a shearing force is applied to the material to be kneaded which has passed through the tip clearance. The tip clearance is the gap between the tip portion (kneading blade apex portion) which is formed as the furthest end surface of the kneading blade, and the inner surface of the casing 70 which forms the chamber 70s.

Furthermore, these kneading blades are formed in a spiral shape in the axial direction D with respect to the rotor section 10, centered about the central axis of the rotor section 10. In this way, since the kneading blades are formed in a spiral shape, a flow of material to be kneaded is generated along the axial direction D by the rotation of the two kneading rotors.

Figure 6:
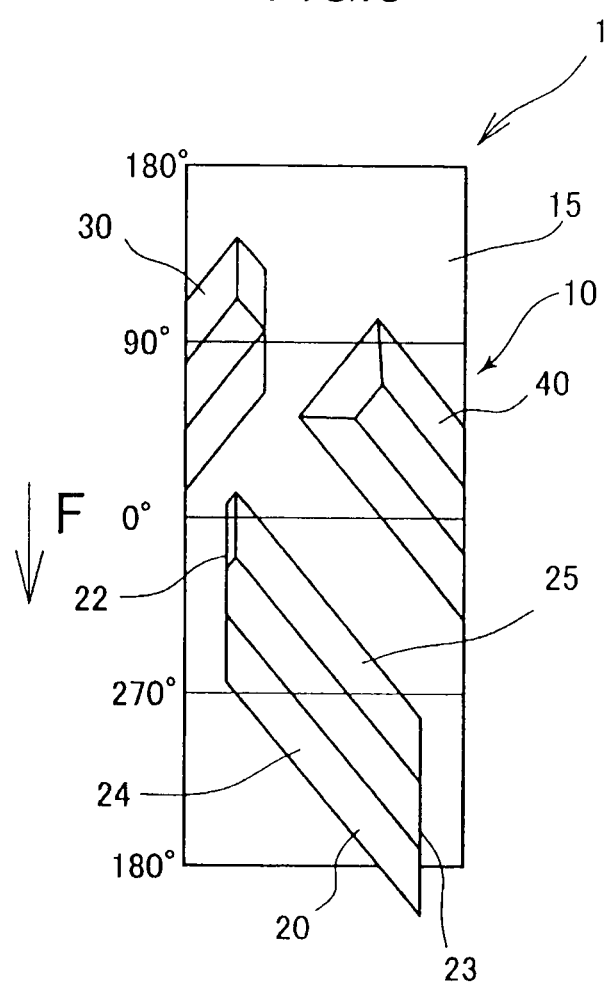
FIG. 6 is a projected plan diagram of kneading sections of a first kneading rotor.
Figure 7:
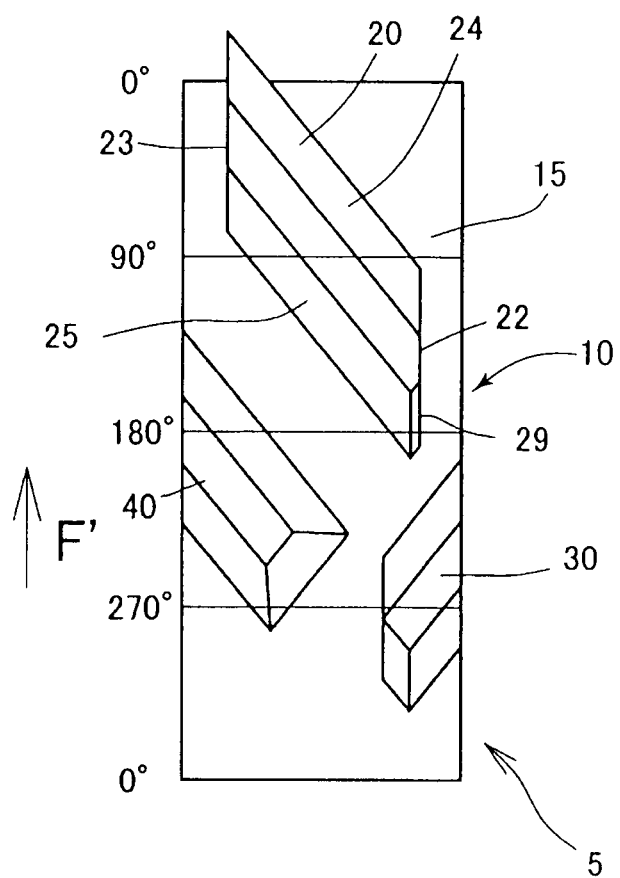
FIG. 7 is a projected plan diagram of kneading sections of a second kneading rotor.
Figure 8:
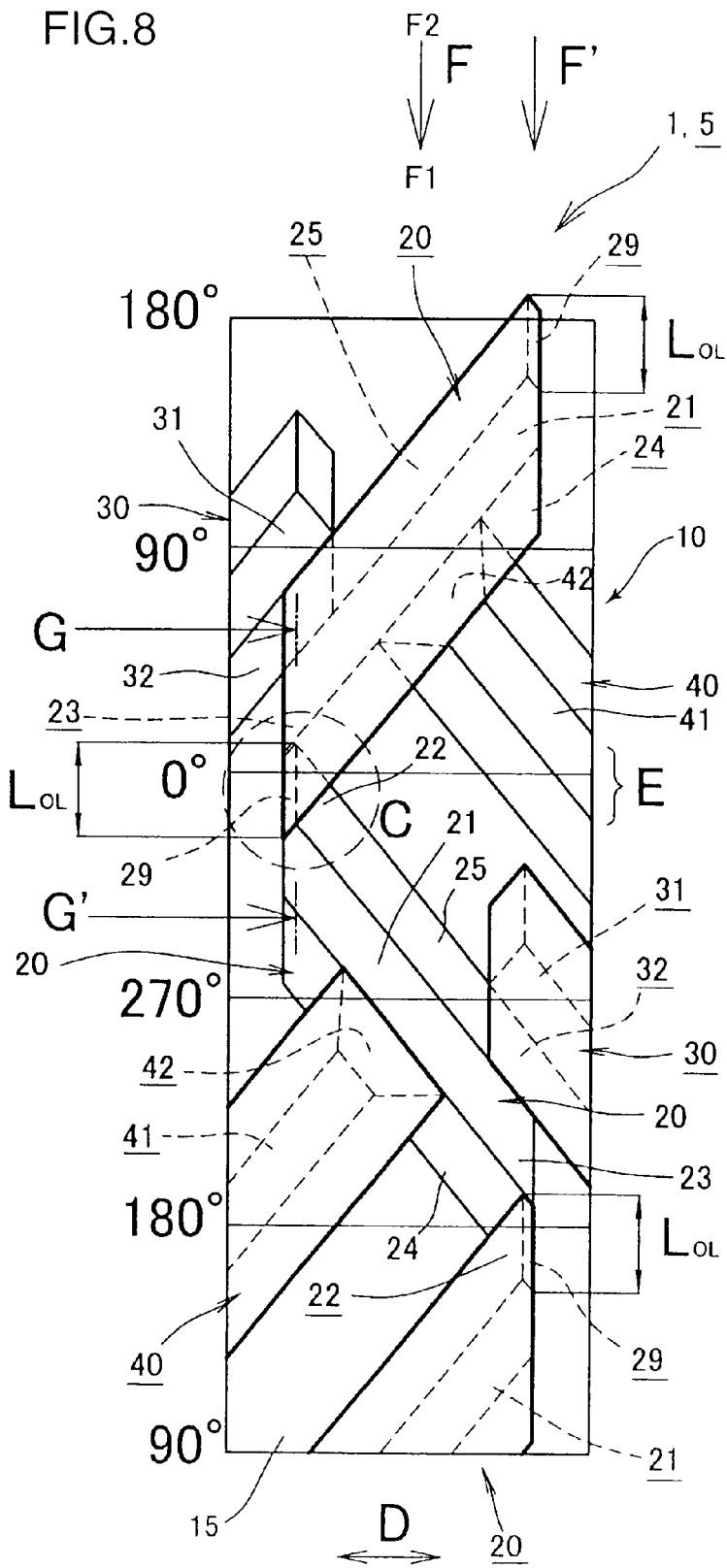
FIG. 8 is a superimposed projected diagram of kneading sections of a first kneading rotor and kneading sections of a second kneading rotor.

FIG. 8 shows a projected diagram of the kneading section (rotor section 10) of the first kneading rotor 1 and a projected diagram of the kneading section (rotor section 10) of the second kneading rotor 5, these diagrams being mutually superimposed in the same phase. In other words, the respective portions of the kneading sections of the two kneading rotors 1 and 5 which are mutually opposing when rotated are shown in superimposed fashion in FIG. 8. The shape of the kneading section of the first kneading rotor 1 shown in FIG. 8 corresponds to the shape shown in FIG. 6, and the shape of the kneading section of the second kneading rotor 5 shown in FIG. 8 corresponds to the shape shown in FIG. 7.

Figure 5:
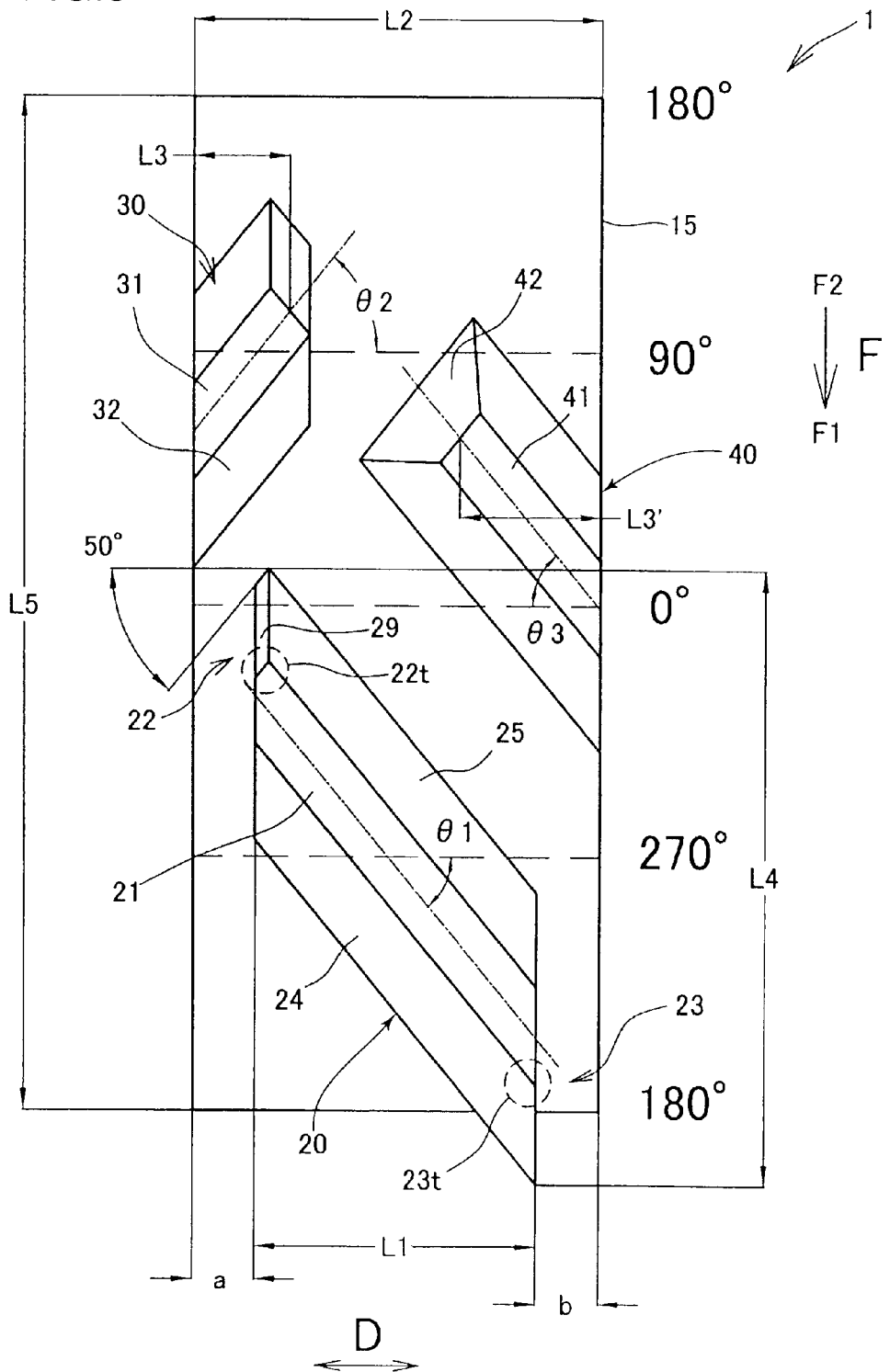
FIG. 5 is a projected plan diagram of kneading sections of a kneading rotor.

The shape of the kneading section of the second kneading rotor 5 shown in FIG. 8 is a mirror image of the shape shown in FIG. 7. Furthermore, in FIG. 8, the portions included in the second kneading rotor 5 are labeled with underlined reference numerals. In FIG. 5 and FIG. 8, F1 represents the forward direction of the direction of rotation F and F2 represents the rearward direction.

Moreover, FIG. 8 shows superimposed projected diagrams of the two rotors 1 and 5 in a state where the phases of the first kneading rotor 1 and the phases of the second kneading rotor 5 are matching, and in this diagram, the direction of rotation F and the direction of rotation F' coincide with each other.

Figure 11:
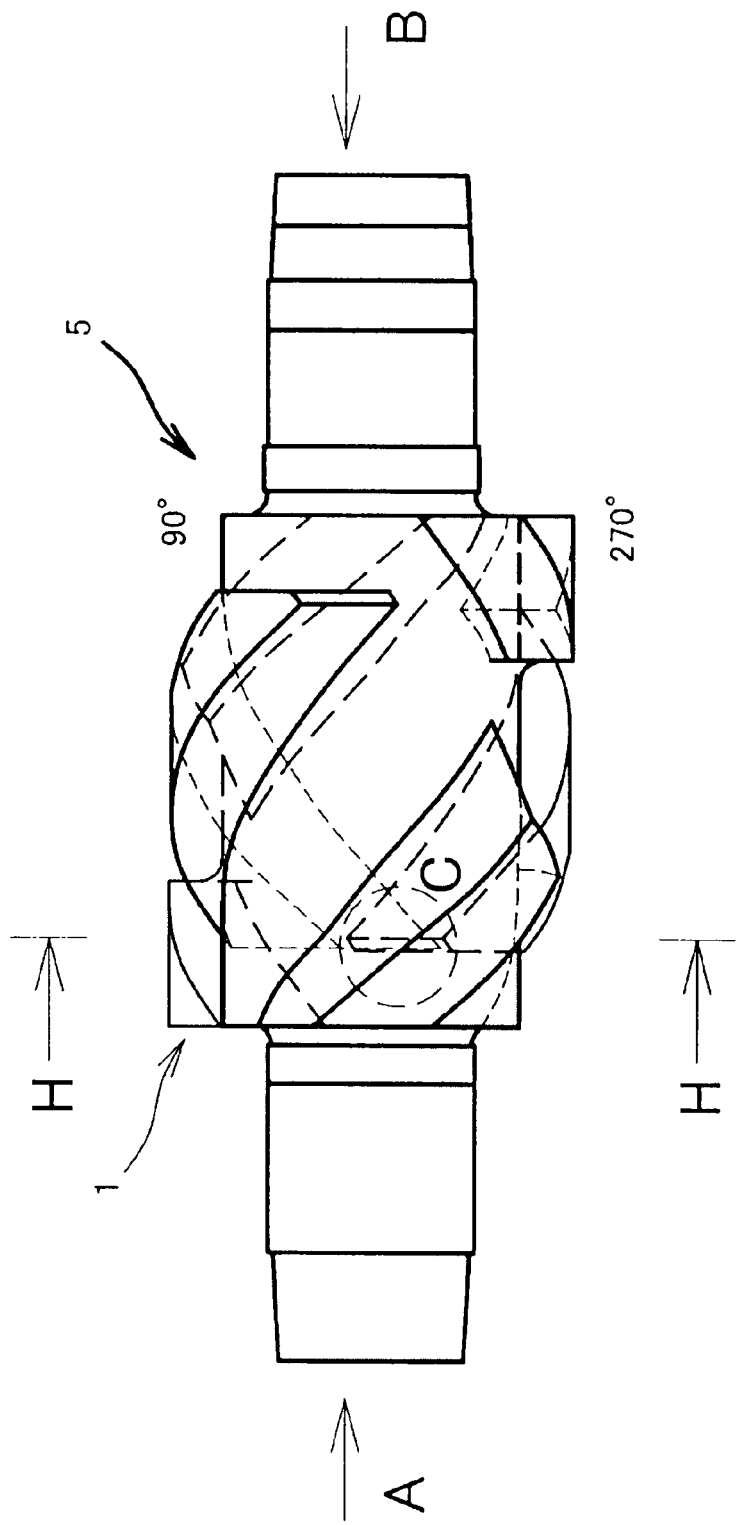
FIG. 11 is a right-side diagram of a first kneading rotor and a second kneading rotor in a state where the respective long blades are in a state of approach.
Figure 12:
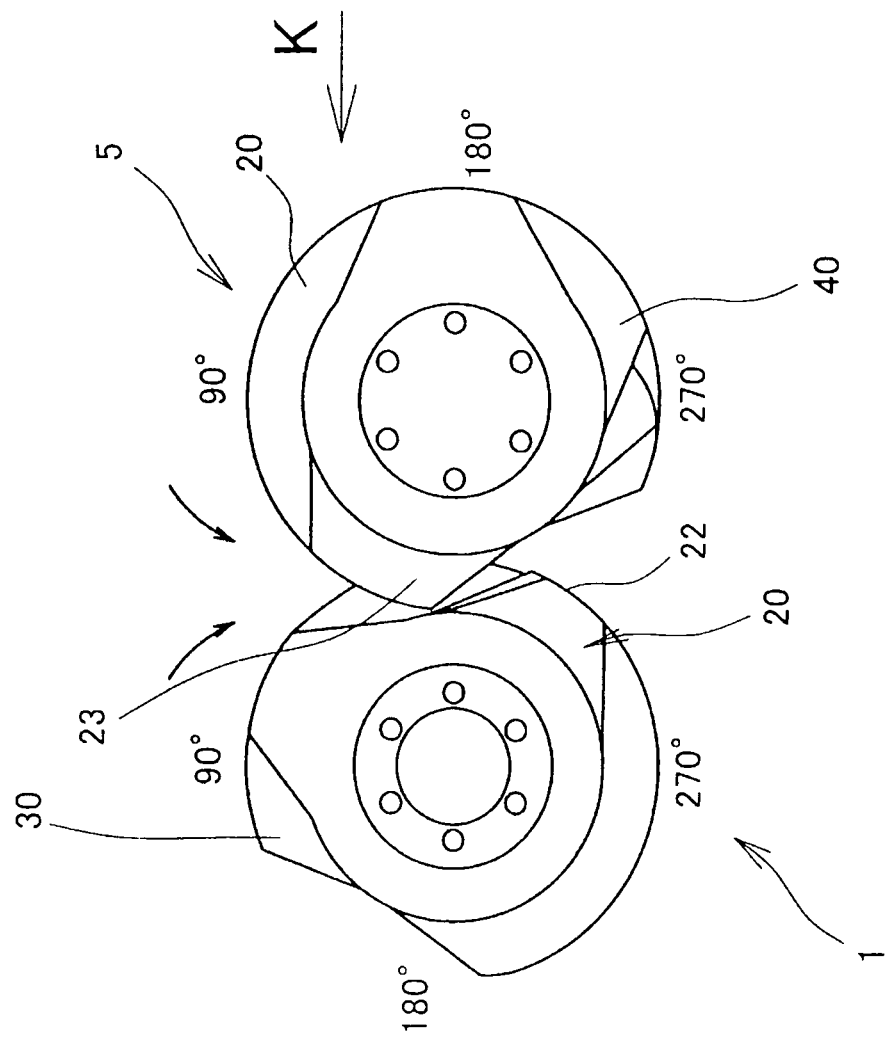
FIG. 12 is a front side diagram of the first kneading rotor and the second kneading rotor shown in FIG. 11.
Figure 13:
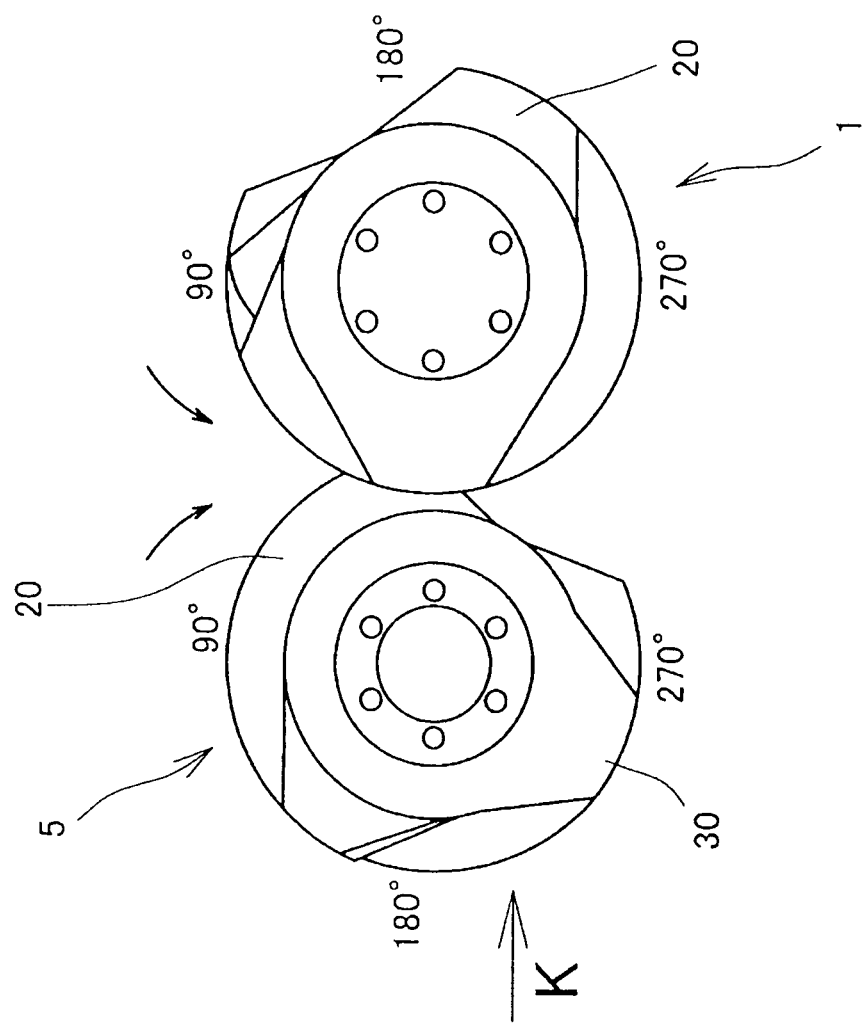
FIG. 13 is a rear side diagram of the first kneading rotor and the second kneading rotor shown in FIG. 11.
Figure 14:
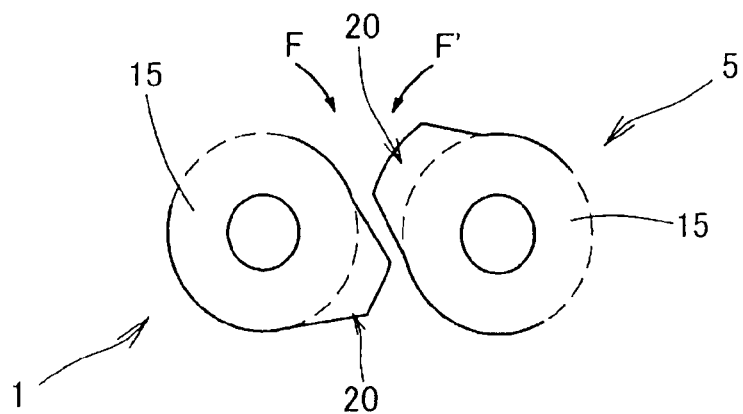
FIG. 14 is a schematic cross-sectional diagram at position G-G' in FIG. 8 of the two kneading rotors in a state immediately before mutual approach of the long blades.
Figure 15:
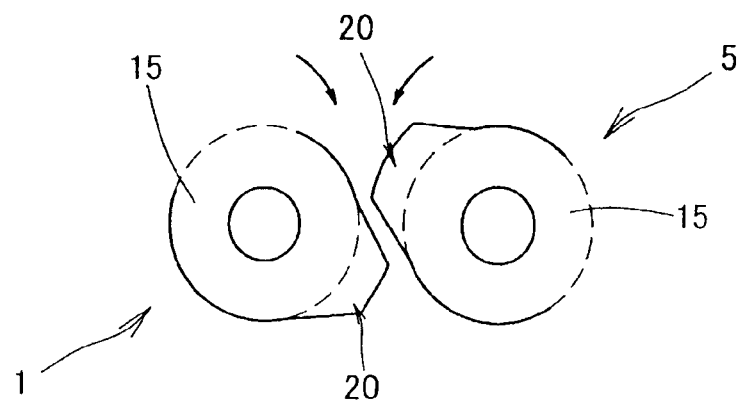
FIG. 15 is a schematic cross-sectional diagram showing a state where the rotation of the kneading rotors has advanced from the state in FIG. 14.
Figure 16:
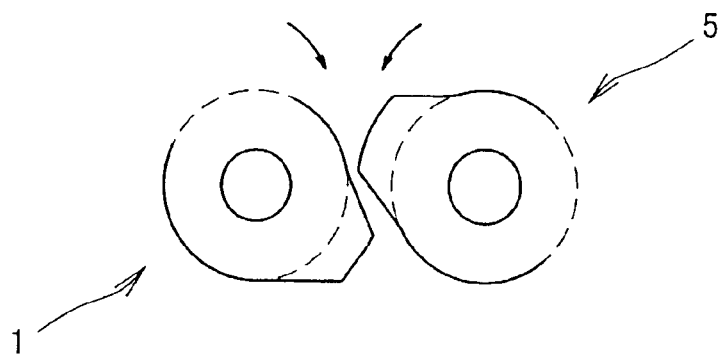
FIG. 16 is a schematic cross-sectional diagram showing a state where the rotation of the kneading rotors has advanced further from the state in FIG. 15.
Figure 17:
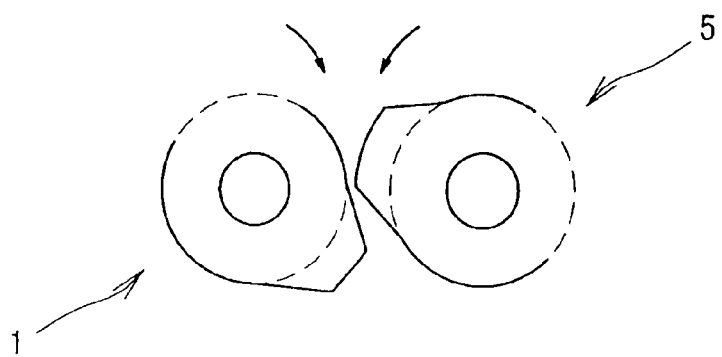
FIG. 17 is a schematic cross-sectional diagram showing a state where the rotation of the kneading rotors has advanced further from the state in FIG. 16.

FIG. 12 is a front side diagram of the two kneading rotors 1 and 5, in other words, a diagram in the direction of arrow A in FIG. 11, and FIG. 13 is a rear side diagram of the two kneading rotors 1 and 5, in other words, a diagram in the direction of arrow B in FIG. 11. More specifically, a diagram in the direction of arrow K in FIG. 12 and FIG. 13 corresponds to FIG. 11.

FIG. 9 corresponds to a diagram of the first kneading rotor 1 viewed in the direction K in the state in FIG. 12, and FIG. 10 corresponds to a diagram of the second kneading rotor 5 viewed in the direction K in the state in FIG. 12. Furthermore, in FIG. 5 to FIG. 13, the relationship between the position in terms of the direction of rotation and the angle which indicates the phase is matching in each of the diagrams.

The respective kneading blades are described below.

(Long Blade)

The long blade 20 is formed in a linear shape in the projected plan diagram of the surface of the rotor section 10 of the first kneading rotor 1. Furthermore, the screw angle θ1 of the long blade 20 with respect to the axial direction D of the rotor section 10 is 50 degrees (see FIG. 5). In FIG. 5, the long blade 20 is formed so as to extend from the upper left side to the lower right side. In FIG. 5, the left-hand side corresponds to the side of the rotor shaft 10j and the right-hand side corresponds to the side of the rotor shaft 10k.

Furthermore, a tip section 21 is formed as a kneading surface at the blade apex portion of the long blade 20. The tip section 21 is formed substantially in parallel with the surface of the rotor section main body 15.

Moreover, a first end section 22 is formed in the rearward side end portion of the long blade 20 (the end portion on side F2) in terms of the direction of rotation F (see the broken circle in FIG. 2 to FIG. 5, FIG. 8 and FIG. 9, and FIG. 18). Furthermore, a first front end 22t is formed in the front end of the first end section 22 (see the broken circle in FIG. 2 and FIG. 3, and FIG. 5 and FIG. 18). The first front end 22t is included in the first end section 22, and the first end section 22 has a greater width than the width of the first front end 22t.

An inclined surface 29 is formed in the first end section 22. The inclined surface 29 is inclined with respect to the axial direction D. Furthermore, the normal direction to the inclined surface 29 is inclined toward the side of the rotor shaft 10j with respect to a virtual plane which is perpendicular to the axial direction D. Therefore, in the front side view in FIG. 3, the inclined surface 29 is visible, but this inclined surface 29 is not visible in the rear surface diagram in FIG. 4. The inclined surface 29 does not have to be formed on the long blade (see modification examples described below).

A second end section 23 is formed in the forward side end portion of the long blade 20 (the end portion on side F1) in terms of the direction of rotation F (see the broken circle in FIG. 2 to FIG. 5, FIG. 8 and FIG. 10, and FIG. 18). Furthermore, a second front end 23t is formed on the front end of the second end section 23 (see the broken circle in FIG. 4, and FIG. 5 and FIG. 18). The second front end 23t is included in the second end section 23, and the second end section 23 has a greater width than the width of the second front end 23t.

Furthermore, a first opposing surface 24 is formed in the forward side portion of the long blade 20 in terms of the direction of rotation F, and a second opposing surface 25 is formed in the rearward side portion of the long blade 20 in terms of the direction of rotation F (see FIG. 5). The first opposing surface 24 and the second opposing surface 25 are surfaces (side faces) which are formed between the tip section 21 and the surface of the rotor section main body 15.

In the long blade 20, the length L1 of the central line of the tip section 21 in the axial direction D is greater than one half of the total length L2 of the rotor section main body 15 in the axial direction D (see FIG. 5).

The length L4 of the long blade 20 in the direction of rotation F (the direction of rotation F' in the second kneading rotor 5) is greater than the total length L5 of the rotor section main body 15 in the direction of rotation F, in other words, greater than one half of the length of the circumference of the rotor section main body 15 in a cross-section perpendicular to the axial direction D (see FIG. 5). More specifically, the phase difference between the respective ends of the long blade 20 in the direction of rotation F is greater than 180 degrees.

Here, L1 is the length of the long blade 20 in the axial direction D and L2 is the total length of the rotor section main body 15 in the axial direction D. In this case, the ratio between L1 and L2 (L1/L2) is equal to or greater than 0.6 and less than 1. Furthermore, if a is taken to be the distance, in the axial direction D, from one end of the long blade 20 (the left-hand end of the long blade 20 in FIG. 5 and FIG. 8) up to the end of the rotor section main body 15 nearest to this end of the long blade 20, then the ratio between a and L2 (a/L2) is greater than 0 and equal to or lower than 0.2. Moreover, if b is taken to be the distance in the axial direction D between the other end of the long blade 20 (the right-hand end of the long blade 20 in FIG. 5 and FIG. 8) and the end of the rotor section main body 15 nearest to this other end of the long blade 20, then a=b. Or, a and b may be different. According to this composition of the long blade 20, more efficient kneading of the material is possible by means of the long blade 20, compared to a case where the long blade is short. Furthermore, in this composition of the long blade 20, since the flow of material is branched off so as to pass to the outer side of the respective ends of the long blade 20, it is possible to achieve uniform kneading of the material.

(Short Blade)

Next, the short blade 30 will be described. The short blade 30 is formed in a linear shape in the projected plan diagram of the surface of the first kneading rotor 1. Furthermore, the screw angle θ2 of the short blade 30 with respect to the axial direction D is 50 degrees (see FIG. 5). In FIG. 5, the short blade 30 is formed so as to extend from the upper right side to the lower left side, in contrast to the long blade 20.

Furthermore, a tip section 31 is formed as a kneading surface at the blade apex portion of the short blade 30. The tip section 31 is formed substantially in parallel with the surface of the rotor section main body 15.

Moreover, an opposing surface 32 is formed in the forward side portion of the short blade 30 in terms of the direction of rotation F. The opposing surface 32 is a surface (side face) which is formed between the tip section 31 and the surface of the rotor section main body 15.

In the short blade 30, the length L3 of the central line of the tip section 31 in the axial direction D is equal to or less than one half of the total length L2 of the rotor section main body 15 (see FIG. 5).

(Medium Blade)

Next, the medium blade 40 will be described. The medium blade 40 is formed in a linear shape in the projected plan diagram of the surface of the first kneading rotor 1. Furthermore, the screw angle θ3 of the medium blade 40 with respect to the axial direction D is 50 degrees (see FIG. 5). In FIG. 5, similarly to the long blade 20, the medium blade 40 is formed so as to extend from the upper left side to the lower right side.

Furthermore, a tip section 41 is formed as a kneading surface at the blade apex portion of the medium blade 40. The tip section 41 is formed substantially in parallel with the surface of the rotor section main body 15.

Moreover, an opposing surface 42 is formed in the rearward side portion of the medium blade 40 in terms of the direction of rotation F (the rearward end portion in the lengthwise direction). The opposing surface 42 is a surface (side face) which is formed between the tip section 41 and the surface of the rotor section main body 15.

In the medium blade 40, the length L3' of the central line of the tip section 41 in the axial direction D is equal to or less than one half of the total length L2 of the rotor section main body 15 (see FIG. 5). Furthermore, L3' is greater than L3.

(Detailed Arrangement of Blades)

There follows a detailed description of the relative positional relationship of the kneading blades, together with an explanation of the state of intermeshing of the pair of kneading rotors, when the pair of kneading rotors are rotated in mutually opposite directions inside the chambers 70s, in other words, when the first kneading rotor 1 is rotated in the direction of rotation F and the second kneading rotor 5 is rotated in the direction of rotation F'.

(Approach A)

With the rotation of the two kneading rotors, the two short blades (short blade 30 and medium blade 40) of the rotor section 10 of the first kneading rotor 1 (one rotor section) alternately repeat an approaching and separating action in the direction of rotation F (direction of rotation F') with respect to the long blade 20 of the rotor section 10 of the second kneading rotor 5 (the other rotor section) (see the region from 20° to 120° in FIG. 8). This approach (intermeshing) between the two short blades (30, 40) of the first kneading rotor 1 and the long blade 20 of the second kneading rotor 5 is called "approach A".

In the approach A, the opposing surface 42 of the medium blade 40 of the first kneading rotor 1 and the first opposing surface 24 of the long blade 20 of the second kneading rotor 5 oppose each other in the direction of rotation. Furthermore, in the approach A, the opposing surface 32 of the short blade 30 of the first kneading rotor 1 and the second opposing surface 25 of the long blade 20 of the second kneading rotor 5 oppose each other in the direction of rotation (see FIG. 8).

Moreover, in the state of the approach A, the central portion of the long blade 20 of the second kneading rotor 5 (the central portion in the direction of rotation F) is sandwiched between the two short blades (30 and 40) of the first kneading rotor 1, in the axial direction D.

(Approach B)

Furthermore, with the rotation of the two kneading rotors, the two short blades (short blade 30 and medium blade 40) of the rotor section 10 of the second kneading rotor 5 (the other rotor section) alternately repeat an approaching and separating action in the direction of rotation F (direction of rotation F') with respect to the long blade 20 of the rotor section 10 of the first kneading rotor 1 (the one rotor section) (see the region from 200° to 300° in FIG. 8). This approach (intermeshing) between the two short blades of the second kneading rotor 5 and the long blade 20 of the first kneading rotor 1 is called "approach B".

In the approach B, the opposing surface 42 of the medium blade 40 of the second kneading rotor 5 and the first opposing surface 24 of the long blade 20 of the first kneading rotor 1 are mutually opposing in the direction of rotation. Furthermore, in approach B, the opposing surface 32 of the short blade 30 of the second kneading rotor 5 and the second opposing surface 25 of the long blade 20 of the first kneading rotor 1 are mutually opposing in the direction of rotation (see FIG. 8).

Furthermore, in the state of the approach B, the central portion of the long blade 20 of the first kneading rotor 1 is sandwiched between the two short blades (30 and 40) of the second kneading rotor 5, in the axial direction D.

(Approach C)

Furthermore, with the rotation of the two kneading rotors, the first end section 22 on the rearward side, in terms of the direction of rotation F, of the long blade 20 of the rotor section 10 of the first kneading rotor 1 (the one rotor section) and the second end section 23 on the forward side, in terms of the direction of rotation F', of the long blade 20 of the rotor section 10 of the second kneading rotor 5 (the other rotor section) alternately repeat a mutually approaching and separating action (see the region from 320° to 30° in FIG. 8). This approach between the first end section 22 of the first kneading rotor 1 and the second end section 23 of the second kneading rotor 5 is called "approach C". The portion C which is surrounded by the broken circle in FIG. 8 and FIG. 11 is the portion of approach between the first end section 22 of the first kneading rotor 1 and the second end section 23 of the second kneading rotor 5 in the state of approach C.

(Approach D)

Furthermore, with the rotation of the two kneading rotors, the first end section 22 on the rearward side, in terms of the direction of rotation F', of the long blade 20 of the rotor section 10 of the second kneading rotor 5 (the other rotor section) and the second end section 23 on the forward side, in terms of the direction of rotation F, of the long blade 20 of the rotor section 10 of the first kneading rotor 1 (the one rotor section) alternately repeat a mutually approaching and separating action (see the region from 130° to 200° in FIG. 8). This approach between the first end section 22 of the second kneading rotor 5 and the second end section 23 of the first kneading rotor 1 is called "approach D".

Moreover, the respective states of approach A, approach B, approach C and approach D are produced in the sequence, approach A, approach C, approach B and approach D, with the rotation of the first kneading rotor 1 in the direction of rotation F and the rotation of the second kneading rotor 5 in the direction of rotation F'. Furthermore, the occurrence of the respective states of approach in this sequence is repeatedly cyclically as the two kneading rotors 1 and 5 rotate. In the present embodiment, the approaches A, B, C and D do not indicate states of contact between the blades of the two kneading rotors 1 and 5. In other words, in the respective states of the approaches A, B, C, and D, a slight gap is formed between the respective blades of the two kneading rotors 1 and 5.

(State of Approach of Long Blades)

Next, a state of approach of the long blades, which is a state where the long blades of the two kneading rotors approach each other, will be described with reference to FIG. 14 to FIG. 18. FIG. 14 to FIG. 18 show one cross-sectional view of the kneading sections of the two kneading rotors perpendicular to the axial direction D, and the position of this cross-section corresponds to the position G-G' in FIG. 8 and the position H-H in FIG. 11. Furthermore, FIG. 18 corresponds to an enlarged view of FIG. 15.

Figure 18:
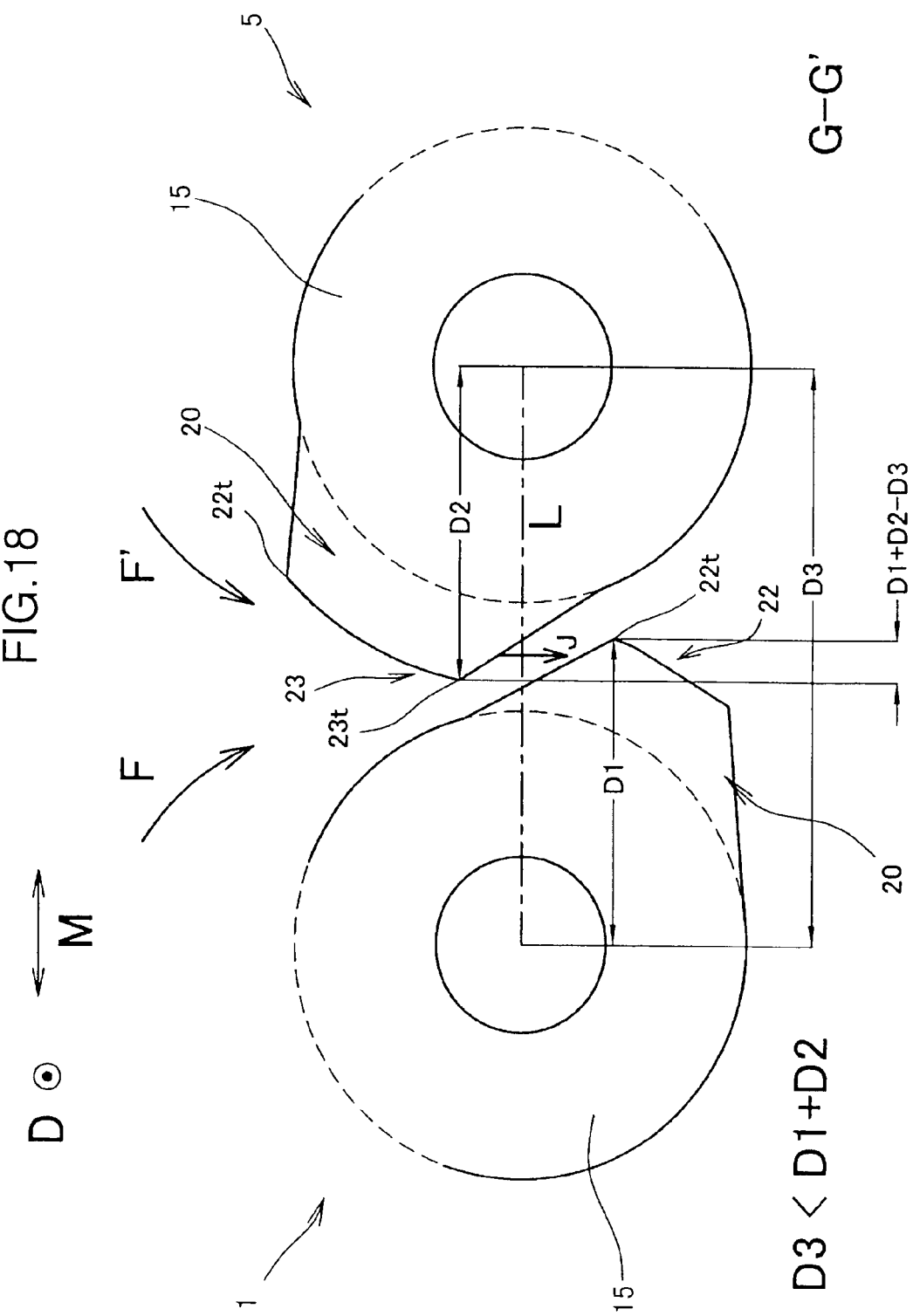
FIG. 18 is an expanded diagram of a schematic cross-sectional diagram of a state of approach of the long blades of the two kneading rotors shown in FIG. 15.

Here, D1 is the distance between the central axis of the rotor section 10 of the first kneading rotor 1 (one rotor section) and the front end of the long blade 20 of that rotor section 10 (first front end 22$t$), in the direction M which links the two central axes of the pair of rotor sections 10 (see the direction indicated by arrow M in FIG. 18). D2 is the distance in this direction M between the central axis of the rotor section 10 of the second kneading rotor 5 (the other one of the rotor sections) and the front end of the long blade 20 of that rotor section 10 (second front end 23$t$). D3 is the distance between the central axes of the rotor sections 10 of the two kneading rotors 1 and 5. In FIG. 18, the relationship D1+D2>D3 is satisfied.

In a state which satisfies the relationship D1+D2>D3 stated above, an overlapping portion (see region E in FIG. 8) is produced in the end portion of the long blade 20 of the first kneading rotor 1 and the end portion of the long blade 20 of the second kneading rotor 5, in the superimposed projected diagrams of the pair of kneading rotors (FIG. 8). The "overlap" means a state where the front end of the long blade 20 of the second kneading rotor 5, which is disposed to the rearward side, is positioned to the forward side of the rear end of the long blade 20 of the first kneading rotor 1 which is disposed to the forward side, in the direction of rotation F and the direction of rotation F'. "Overlap" also refers, similarly, to a state where the front end of the long blade 20 of the first kneading rotor 1, which is disposed to the rearward side, is positioned to the forward side of the rear end of the long blade 20 of the second kneading rotor 5 which is disposed to the forward side, in the direction of rotation F and the direction of rotation F'.

In FIG. 8, the length indicated by $L_{OL}$, is the overlap length. Furthermore, in one cross-section perpendicular to the axial direction D of the kneading rotors 1 and 5 shown in FIG. 18, the overlap length is D1+D2−D3. The "state of approach of the long blades" means a state where the relationship D1+D2>D3 is established and where (D1+D2−D3) is a maximum.

Before and after the state of approach of the long blades, the positional relationship of the long blades 20 of the kneading rotors 1 and 5 changes in the sequence shown in FIG. 14, FIG. 15, FIG. 16 and FIG. 17, due to the rotation of the two kneading rotors 1 and 5. The state of approach of the long blades occurs twice with each revolution of the two kneading rotors 1 and 5. One of the two states of approach of the long blades which occurs is called the first state of approach of the long blades and the other one is called the second state of approach of the long blades.

In FIG. 18, the relationship D1+D2>D3 is described in respect of an example of the first state of approach of the long blades (the state of opposition A described below and the state of approach C described above), but this relationship is established in a similar manner in the second state of approach of the long blades (the state of opposition B described below and the state of approach D described above) as well. In the second state of approach of the long blades, the value D1 in the expression D1+D2>D3 is the distance in the direction M between the central axis of the rotor section 10 of the second kneading rotor 5 (the other rotor section) and the front end of the long blade 20 of that rotor section 10 (the first front end 22*t*), and the value D2 is the distance between the central axis of the rotor section 10 of the first kneading rotor 1 (the one rotor section) and the front end of the long blade 20 (the second front end 23*t*) with respect to the direction M.

(Opposition A)

In the first state of approach of the long blades, the first end section 22 of the long blade 20 of the first kneading rotor 1 and the second end section 23 of the long blade 20 of the second kneading rotor 5 oppose each other in the direction of rotation of the rotor section 10 on a line which links the respective central axes of the rotor sections 10 of the two kneading rotors 1 and 5 (see the single-dotted line L in FIG. 18), in other words, in a direction J (see the direction J shown by the arrow in FIG. 18) perpendicular to the straight line L. This is called opposition A. Opposition A occurs together with approach C.

(Opposition B)

In the second state of approach of the long blades, the first end section 22 of the long blade 20 of the second kneading rotor 5 and the second end section 23 of the long blade 20 of the first kneading rotor 1 oppose each other in the direction of rotation of the rotor section 10 on a line which links the respective central axes of the rotor sections 10 of the two kneading rotors 1 and 5 (see the single-dotted line L in FIG. 18), in other words, in a direction J (see the direction J shown by the arrow in FIG. 18) perpendicular to the straight line L. This is called opposition B. Opposition B occurs together with approach D.

(Beneficial Effects)

Next, the beneficial effects obtained by means of the kneading rotors and the closed kneading machine 80 according to the present embodiment will be described.

The first kneading rotor 1 is an intermeshing type of kneading rotor of a closed kneading machine 80, as described above, and comprises a rotor section 10 which is disposed in a chamber 70*s* of the closed kneading machine 80. The rotor section 10 has a rotor section main body 15 of a round cylindrical shape, and one long blade 20 and two short blades (30, 40) provided on the surface of the rotor section main body 15; the length L4 of the long blade 20 in the direction of rotation F of the rotor section 10 is greater than one half of the total length L5 of the rotor section main body 15 in the direction of rotation F. Moreover, the ratio (L1/L2) between the length L1 of the long blade 20 in the axial direction D of the rotor section 10 and the total length L2 of the rotor section main body 15 in the axial direction D is equal to or greater than 0.6 and less than 1, and the ratio (a/L2) between the distance a in the axial direction D from one end of the long blade 20 to the end of the rotor section main body 15, and the total length L2 of the rotor section main body 15 in the axial direction D is greater than 0 and equal to or less than 0.2. The two short blades (30, 40) of the rotor section 10 of the first kneading rotor 1 are arranged in such a manner that, in a case where the rotor section 10 of the first kneading rotor 1 and the rotor section 10 of the second kneading rotor 5 are arranged mutually in parallel inside the chambers 70*s* of the closed kneading machine 80 and are rotated in mutually opposite directions, the two short blades (30, 40) of the rotor section 10 of the first kneading rotor 1 repeat an approaching and separating action in the direction of rotation F (direction of rotation F') of the rotor section 10 with respect to the long blade 20 of the rotor section 10 of the second kneading rotor 5, and in the states of approach described above, the long blade 20 of the rotor section 10 of the second kneading rotor 5 is sandwiched in the axial direction D between the two short blades (30, 40) of the rotor section 10 of the first kneading rotor 1. Furthermore, the long blade 20 of the first kneading rotor 1 is disposed in such a manner that, in a case where the rotor section 10 of the first kneading rotor 1 and the rotor section 10 of the second kneading rotor 5 are arranged mutually in parallel inside the chambers 70*s* of the closed kneading machine 80 and are rotated in mutually opposite directions, the first end section 22 which is the rearward side end portion of the long blade 20 of the rotor section 10 of the first kneading rotor 1 in the direction of rotation F of that rotor section 10 and the second end section 23 which is the forward side end portion of the long blade 20 of the rotor section 10 of the second kneading rotor 5 in the direction of rotation F' of that rotor section 10 alternately repeat a mutually approaching and separating action, and in the state of approach described above (first state of approach of the long blades), the first end section 22 of the first kneading rotor 1 and the second end section 23 of the second kneading rotor 5 oppose each other in the direction of rotation F of the rotor section 10 (direction J) on a straight line L linking the central axes of the pair of rotor sections 10, in one cross-section perpendicular to the axial direction D (G-G' cross-section).

In this composition, the length L4 of the long blade 20 in the direction of rotation F of the rotor section 10 is greater than one half of the total length L5 of the rotor section main body 15 in the direction of rotation F, and when the long blades 20 of the pair of rotor sections 10 approach each other, the first end section 22 and the second end section 23 of these long blades 20 oppose each other in the direction of rotation F of the rotor section 10 on the straight line L linking the respective central axes of the pair of rotor sections 10, in other words, in a direction perpendicular to the straight line L linking the respective central axes of the pair of rotor sections 10. Consequently, since the mutually opposing end sections of the long blades 20 of the pair of rotor sections 10 shut off the material leakage path inside the chambers 70*s*, it is possible to reduce or to eliminate leaking of material from the gap between the two end sections. Therefore, it is possible to raise the material shearing performance by the kneading rotors. Furthermore, in the present composition, it is possible to raise the material shearing performance by the kneading rotors by means of the end sections of the pair of long blades 20, and therefore it is possible to maintain high shearing properties even if the material fluidity properties of the kneading rotors are raised by increasing the screw angle of the long blades 20. Consequently, in the present composition, a kneading rotor having both excellent material fluidity properties and excellent material shearing properties is obtained.

Here, the beneficial effects obtained by the first kneading rotor 1 have been described, but similar beneficial effects are obtained by means of the second kneading rotor 5 as well. In considering the second kneading rotor 5, reference to "direction of rotation F" in the description of the beneficial effects given above should be rewritten as "direction of rotation F'".

Furthermore, in the first kneading rotor 1, the long blade 20 has a screw angle of 50° with respect to the axial direction D. Since the screw angle of the long blade 20 is equal to or greater than 50° and equal to or less than 57°, then it is possible sufficiently to suppress variation in the mixing performance by the kneading rotors.

The closed kneading machine 80 comprises: a casing 70 in which chambers 70*s* are provided, and which has a material supply port 71 provided in a position above the chambers 70*s* and a material discharge port 72 provided in a position below the chambers 70*s*, the chambers 70*s* being hermetically sealed by closing the material supply port 71 and the material discharge port 72, and a first kneading rotor 1 and a second kneading rotor 5 of an intermeshing type which are accommodated in the chambers 70s and which are arranged mutually in parallel. Furthermore, the respective kneading rotors 1 and 5 each has a rotor section 10 and the respective rotor sections 10 have a rotor section main body 15 of a round cylindrical shape, one long blade 20 and two short blades (short blade 30 and medium blade 40) which are provided on the surface of the rotor section main body 15 of the rotor section 10. In each rotor section 10, the length L4 of the long blade 20 of the rotor section 10 in the direction of rotation F (direction of rotation F') is greater than one half of the total length L5 of the rotor section main body 15 in the direction of rotation F (direction of rotation F'). Moreover, in each of the rotor sections 10, the ratio (L1/L2) between the length L1 of the long blade 20 in the axial direction D of the rotor section 10 and the total length L2 of the rotor section main body 15 in the axial direction D is equal to or greater than 0.6 and less than 1, and the ratio (a/L2) between the distance a in the axial direction D from one end of the long blade 20 to the end of the rotor section main body 15, and the total length L2 of the rotor section main body 15 in the axial direction D is greater than 0 and equal to or less than 0.2. The two short blades (30, 40) of the rotor section 10 of the first kneading rotor 1 are arranged in such a manner that, in a case where the rotor section 10 of the first kneading rotor 1 and the rotor section 10 of the second kneading rotor 5 are rotated in mutually opposite directions, the two short blades (30, 40) of the rotor section 10 of the first kneading rotor 1 alternately repeat an approaching and separating action in the direction of rotation F (direction of rotation F') of the rotor section 10 with respect to the long blade 20 of the rotor section 10 of the second kneading rotor 5, and in the states of approach described above, the long blade 20 of the rotor section 10 of the second kneading rotor 5 is sandwiched in the axial direction D between the two short blades (30, 40) of the rotor section 10 of the first kneading rotor 1. Furthermore, the long blade 20 of the first kneading rotor 1 is disposed in such a manner that, in a case where the rotor section 10 of the first kneading rotor 1 and the rotor section 10 of the second kneading rotor 5 are rotated in mutually opposite directions, the first end section 22 which is the rearward side end portion of the long blade 20 of the rotor section 10 of the first kneading rotor 1 in the direction of rotation F of that rotor section 10 and the second end section 23 which is the forward side end portion of the long blade 20 of the rotor section 10 of the second kneading rotor 5 in the direction of rotation F' of that rotor section 10 alternately repeat a mutually approaching and separating action, and in the state of approach described above (first state of approach of the long blades), the first end section 22 of the first kneading rotor 1 and the second end section 23 of the second kneading rotor 5 oppose each other mutually in the direction of rotation F of the rotor section 10 (direction J) on a straight line L linking the central axes of the pair of rotor sections 10, in one cross-section perpendicular to the axial direction D.

In this composition, the length L4 of the long blade 20 in the direction of rotation of the rotor section 10 is greater than one half of the total length L5 of the rotor section main body 15 in the direction of rotation, and when the long blades 20 of the pair of rotor sections 10 approach each other, the first end section 22 and the second end section 23 of these long blades 20 oppose each other in the direction of rotation F of the rotor section 10 on the straight line L linking the respective central axes of the pair of rotor sections 10, in other words, in a direction perpendicular to the straight line L linking the respective central axes of the pair of rotor sections 10. Consequently, since the mutually opposing end sections of the long blades 20 of the pair of rotor sections 10 shut off the material leakage path inside the chambers 70s, it is possible to reduce or to eliminate leaking of material from the gap between the two end sections. Therefore, it is possible to raise the material shearing performance by the closed kneading machine 80. Furthermore, in the present composition, it is possible to raise the material shearing performance by the closed kneading machine 80 by means of the end sections of the pair of long blades 20, and therefore it is possible to maintain high shearing properties even if the material fluidity properties of the closed kneading machine 80 are raised by increasing the screw angle of the long blades 20. Consequently, in the present composition, a closed kneading machine 80 having both excellent material fluidity properties and excellent material shearing properties is obtained.

The first kneading rotor 1 is an intermeshing type of kneading rotor of a closed kneading machine 80, and comprises a rotor section 10 which is disposed in a chamber 70s of the closed kneading machine 80. The rotor section 10 has a rotor section main body 15 of a round cylindrical shape, and one long blade 20 and two short blades (30, 40) provided on the surface of the rotor section main body 15; the length L4 of the long blade 20 in the direction of rotation F of the rotor section 10 is greater than one half of the total length L5 of the rotor section main body 15 in the direction of rotation F. Moreover, the ratio (L1/L2) between the length L1 of the long blade 20 in the axial direction D of the rotor section 10 and the total length L2 of the rotor section 10 in the axial direction D is equal to or greater than 0.6 and less than 1, and the ratio (a/L2) between the distance a in the axial direction D from one end of the long blade 20 to the end of the rotor section main body 15, and the total length L2 of the rotor section main body 15 in the axial direction D is greater than 0 and equal to or less than 0.2. The two short blades (30, 40) of the rotor section 10 of the first kneading rotor 1 are arranged in such a manner that, in a case where the rotor section 10 of the first kneading rotor 1 and the rotor section 10 of the second kneading rotor 5 are arranged mutually in parallel inside the chambers 70s of the closed kneading machine 80 and are rotated in mutually opposite directions, the two short blades (30, 40) of the rotor section 10 of the first kneading rotor 1 alternately repeat an approaching and separating action in the direction of rotation F (direction of rotation F') of the rotor section 10 with respect to the long blade 20 of the rotor section 10 of the second kneading rotor 5, and in the states of approach described above, the long blade 20 of the rotor section 10 of the second kneading rotor 5 is sandwiched in the axial direction D between the two short blades (30, 40) of the rotor section 10 of the first kneading rotor 1. Furthermore, then the long blade 20 of the first kneading rotor 1 is disposed in such a manner that, in a case where the rotor section 10 of the first kneading rotor 1 and the rotor section 10 of the second kneading rotor 5 are arranged mutually in parallel inside the chambers 70s of the closed kneading machine 80 and are rotated in mutually opposite directions, the first end section 22 which is the rearward side end portion of the long blade 20 of the rotor section 10 of the first kneading rotor 1 in the direction of rotation F of that rotor section 10 and the second end section 23 which is the forward side end portion of the long blade 20 of the rotor section 10 of the second kneading rotor 5 in the direction of rotation F' of that rotor section 10 alternately repeat a mutually approaching and separating action, and in the state of approach described above, the distance D1 between the central axis of the rotor section 10 of the first kneading rotor 1 and the first front end 22t of the long blade 20, the distance D2 between the central axis of the rotor section 10 of the second kneading rotor 5 and the second front end 23t of the long blade 20, and the distance D3 between the central axes of the pair of rotor sections 10, satisfy the relationship D1+D2>D3, in the direction M linking the respective central axes of the pair of rotor sections 10 in one cross-section perpendicular to the axial direction D (section G-G').

In this composition, the length L4 of the long blade 20 in the direction of rotation F of the rotor section 10 is greater than one half of the total length L5 of the rotor section main body 15 in the direction of rotation F, and furthermore, the distances D1, D2 and D3 in the direction M linking the respective central axes of the pair of rotor sections 10 satisfy the relationship D1+D2>D3. Therefore, in the superimposed projected diagrams of the pair of kneading rotors 1 and 5, a mutually overlapping portion is produced in the direction of rotation of the rotor sections 10 between the end portions of the long blades 20 of the pair of kneading rotors 1 and 5. In other words, in the superimposed projected diagram of the pair of kneading rotors 1 and 5, a portion occurs where the front end of the long blade 20 which is disposed to the rearward side in the direction of rotation of the rotor section 10 is positioned to the forward side of the rear end of the long blade 20 which is disposed to the forward side in the direction of rotation of the rotor section 10 (see region E in FIG. 8). Consequently, since the mutually opposing end sections of the long blades 20 of the pair of rotor sections 10 shut off the material leakage path inside the chambers 70s, it is possible to reduce or to eliminate leaking of material from the gap between the two end sections. Therefore, it is possible to raise the material shearing performance by the kneading rotors 1 and 5. Furthermore, in the present composition, it is possible to raise the material shearing performance by the kneading rotors 1 and 5 by means of the end sections of the pair of long blades 20, and therefore it is possible to maintain high shearing properties even if the material fluidity properties of the kneading rotors 1 and 5 are raised by increasing the screw angle of the long blades 20. Consequently, in the present composition, a kneading rotor having both excellent material fluidity properties and excellent material shearing properties is obtained.

Here, the beneficial effects obtained by the first kneading rotor 1 have been described, but similar beneficial effects are also obtained by means of the second kneading rotor 5 as well. In considering the second kneading rotor 5, reference to "direction of rotation F" in the description of the beneficial effects given above should be rewritten as "direction of rotation F'".

The closed kneading machine 80 comprises: a casing 70 in which chambers 70s are provided, and which has a material supply port 71 provided in a position above the chambers 70s and a material discharge port 72 provided in a position below the chambers 70s, the chambers 70s being hermetically sealed by closing the material supply port 71 and the material discharge port 72, and a first kneading rotor 1 and a second kneading rotor 5 of an intermeshing type which are accommodated in the chambers 70s and which are arranged mutually in parallel. Furthermore, the respective kneading rotors 1 and 5 each have a rotor section 10, and the respective rotor sections 10 have the rotor section main body 15 of a round cylindrical shape, one long blade 20 and two short blades (short blade 30 and medium blade 40) which are provided on the surface of the rotor section main body 15. In each rotor section 10, the length L4 of the long blade 20 of the rotor section 10 in the direction of rotation F (direction of rotation F') is greater than one half of the total length L5 of the rotor section main body 15 in the direction of rotation F (direction of rotation F'). Moreover, in each of the rotor sections 10, the ratio (L1/L2) between the length L1 of the long blade 20 in the axial direction D of the rotor section 10 and the total length L2 of the rotor section main body 15 in the axial direction D is equal to or greater than 0.6 and less than 1, and the ratio (a/L2) between the distance a in the axial direction D from one end of the long blade 20 to the end of the rotor section main body 15, and the total length L2 of the rotor section main body 15 in the axial direction D is greater than 0 and equal to or less than 0.2. The two short blades (30, 40) of the rotor section 10 of the first kneading rotor 1 are arranged in such a manner that, in a case where the rotor section 10 of the first kneading rotor 1 and the rotor section 10 of the second kneading rotor 5 are rotated in mutually opposite directions, the two short blades (30, 40) of the first kneading rotor 1 alternately repeat an approaching and separating action in the direction of rotation F (direction of rotation F') of the rotor section 10 with respect to the long blade 20 of the rotor section 10 of the second kneading rotor 5, and in the states of approach described above, the long blade 20 of the rotor section 10 of the second kneading rotor 5 is sandwiched in the axial direction D between the two short blades (30, 40) of the rotor section 10 of the first kneading rotor 1. Furthermore, the long blade 20 of the first kneading rotor 1 is disposed in such a manner that, in a case where the rotor section 10 of the first kneading rotor 1 and the rotor section 10 of the second kneading rotor 5 are rotated in mutually opposite directions, the first end section 22 which is the rearward side end portion of the long blade 20 of the rotor section 10 of the first kneading rotor 1 in the direction of rotation F of that rotor section 10 and the second end section 23 which is the forward side end portion of the long blade 20 of the rotor section 10 of the second kneading rotor 5 in the direction of rotation F' of that rotor section 10 alternately repeat a mutually approaching and separating action, and in the state of approach described above, the distance D1 between the central axis of the rotor section 10 of the first kneading rotor 1 and the front end of the long blade 20 of that rotor section 10, the distance D2 between the central axis of the rotor section 10 of the second kneading rotor 5 and the front end of the long blade 20 of that rotor section 10, and the distance D3 between the central axes of the pair of rotor sections 10, satisfy the relationship D1+D2>D3 in the direction M linking the respective central axes of the pair of rotor sections 10, in one cross-section perpendicular to the axial direction D.

In this composition, the length L4 of the long blade 20 in the direction of rotation F of the rotor section 10 is greater than one half of the total length L5 of the rotor section main body 15 in the direction of rotation F, and furthermore, the distances D1, D2 and D3 in the direction M linking the respective central axes of the pair of rotor sections 10 satisfy the relationship D1+D2>D3. Therefore, in the superimposed projected diagrams of the pair of kneading rotors 1 and 5, a mutually overlapping portion is produced in the direction of rotation of the rotor sections 10 between the end portions of the long blades 20 of the pair of kneading rotors 1 and 5. In other words, in the superimposed projected diagram of the pair of kneading rotors 1 and 5, a portion occurs where the front end of the long blade 20 which is disposed to the rearward side in the direction of rotation of the rotor section 10 is positioned to the forward side of the rear end of the long blade 20 which is disposed to the forward side in the direction of rotation of the rotor section 10 (see region E in FIG. 8). Consequently, since the mutually opposing end sections of the long blades 20 of the pair of rotor sections 10 shut off the material leakage path inside the chambers 70s, and therefore it is possible to reduce or to eliminate leaking of material from the gap between the two end sections. Therefore, it is possible to raise the material shearing performance by the closed kneading machine 80. Furthermore, in the present composition, it is possible to raise the material shearing performance by the closed kneading machine 80 by means of the end sections of the pair of long blades 20, and therefore it is possible to maintain high shearing properties even if the material fluidity properties of the closed kneading machine 80 are raised by increasing the screw angle of the long blades 20. Consequently, in the present composition, a closed kneading machine 80 having both excellent material fluidity properties and excellent material shearing properties is obtained.

Furthermore, if the approaching portions of the kneading blades are few in the two kneading rotors 1 and 5, then the material to be kneaded which has become attached to the kneading blades of one of the kneading rotors stays attached rather than being scraped off by the kneading blades of the other kneading rotor, and therefore remains on the surface of the kneading blades of the kneading rotor. In the present embodiment, the kneading blades of the two kneading rotors 1 and 5 approach each other in a greater number of positions than in a conventional kneading rotor where the pair of long blades are not mutually overlapping. More specifically, looking in particular at the long blade 20 of one of the rotor sections 10, not only does this long blade 20 oppose the two short blades (short blade 30 and medium blade 40) of the other rotor section 10 in two positions, but furthermore the long blade 20 also opposes the long blade 20 of the other rotor section 10 in the two positions of the first end section 22 and the second end section 23 of the long blade 20. In other words, one long blade 20 has approaching portions in four positions with respect to the other long blade 20. Therefore, in the closed kneading machine 80, it is possible to restrict the material for kneading from remaining partially attached to the surface of the rotor sections 10 of the kneading rotors and rotating together with the rotor sections 10 in a state of covering the surfaces of the rotor sections 10.

As described above, in the closed kneading machine 80 according to the present embodiment, there are a large number of approaching portions between the kneading blades of the pair of kneading rotors 1 and 5. Therefore, a large amount of material to be kneaded is scraped off from the surfaces of the kneading rotors in the approaching portions of the respective kneading blades, and hence a large contact surface area of the surface of the kneading rotors which makes contact with the material to be kneaded is exposed. Furthermore, since the frequency of approach between the kneading blades of the pair of kneading rotors 1 and 5 is high, then the time during which the contact surface is covered with the material to be kneaded is small. Consequently, excellent kneading effects are obtained by means of the closed kneading machine 80.

Practical Examples

Next, practical examples of the closed kneading machine according to the present invention will be described.

Experiment 1

Firstly, an experiment of kneading material to be kneaded was carried out using a closed kneading machine (a Kobelco BB-16) which incorporates kneading rotors according to the practical example of the present invention, and the quality of the material after kneading was evaluated (Experiment 1). Here, the quality of the material was evaluated by measuring the ΔG' value of the material. The ΔG' value means the difference between the storage elastic modulus in the case of small distorting deformation of the material after kneading and the storage elastic modulus in the case of large distorting deformation of the material after kneading, and is an indicator used to judge quality in relation to the dispersion of filler in the material after kneading. The storage elastic modulus in the case of small distorting deformation of the material after kneading is obtained from the viscoelastic properties of an unvulcanized rubber composition. If the ΔG' value is small, then the quality of the kneaded material in relation to filler dispersion is good. Furthermore, ΔG' is represented by the difference in the modules of rigidity between a material combined with silica and a material which is not combined with silica.

(Compounding Agents and PHR)

The materials combined together as the material to be kneaded in the present experiment, and their PHR values, are shown below.

S-SBR: 96
BR: 30
Silica: 80
Silica coupling agent: 6.4
ZnO: 3.0
Stearic acid: 2.0
Aroma oil: 15
Rubber antidegradant 6 PPD: 1.5
Antiozonant wax: 1.0

The PHR (Parts per Hundred Rubber; parts by weight) means the weights of the respective ingredients when the weight of rubber is 100. S-SBR is a solution-polymerized styrene butadiene rubber and BR is a butadiene rubber. Furthermore, PPD is p-phenylene diamine.

Comparative Examples

Next, a comparative example of Experiment 1 will be described. The closed kneading machine according to the comparative example uses two kneading rotors (kneading rotor 901 and kneading rotor 905) which are shown in the superimposed projected diagram in FIG. 23. The kneading rotor 901 and the kneading rotor 905 according to the present comparative example respectively comprise a rotor section main body 915 of a round cylindrical shape and three kneading blades (a long blade 920, a short blade 930 and a medium blade 940) which are provided on the surface of this rotor section main body 915.

In FIG. 23, the portions labeled with the reference numerals 901, 905, 910, 915, 920, 921, 924, 925, 929, 930, 931, 932, 940, 941 and 942 correspond respectively to the portions labeled with the reference numerals 1, 5, 10, 15, 20, 21, 24, 25, 29, 30, 31, 32, 40, 41 and 42 in the embodiment described above. Furthermore, in FIG. 23, the reference numerals of the portions included in the kneading rotor 901 are not underlined, whereas the reference numerals of the portions included in the kneading rotor 905 are underlined.

In this comparative example, the length of the long blade 920 in the direction of rotation F of the kneading rotor 901 is less than one half of the total length of the rotor section main body 915 in the direction of rotation F. In the comparative example, there are no overlapping portions in the respective end sections of the pair of long blades 920, as indicated inside the broken circle N in FIG. 23. The portion between the end sections of the two long blades 920 shown inside the broken circle N forms a material leakage path.

Furthermore, in the comparative example, the screw angles of the long blade 920, the short blade 930 and the medium blade 940 with respect to the axial direction D are the same as the screw angles of the corresponding portions in the kneading rotor relating to the practical example which was used in Experiment 1 described above. Furthermore, in the pair of kneading rotors of the comparative example, with the rotation of the kneading rotors, while the long blade 920 of one kneading rotor is sandwiched between the two short blades of the other kneading rotor (short blade 930 and medium blade 940) in the axial direction D, these two short blades repeat an approaching and separating action with respect to the long blade 920.

Figure 19:
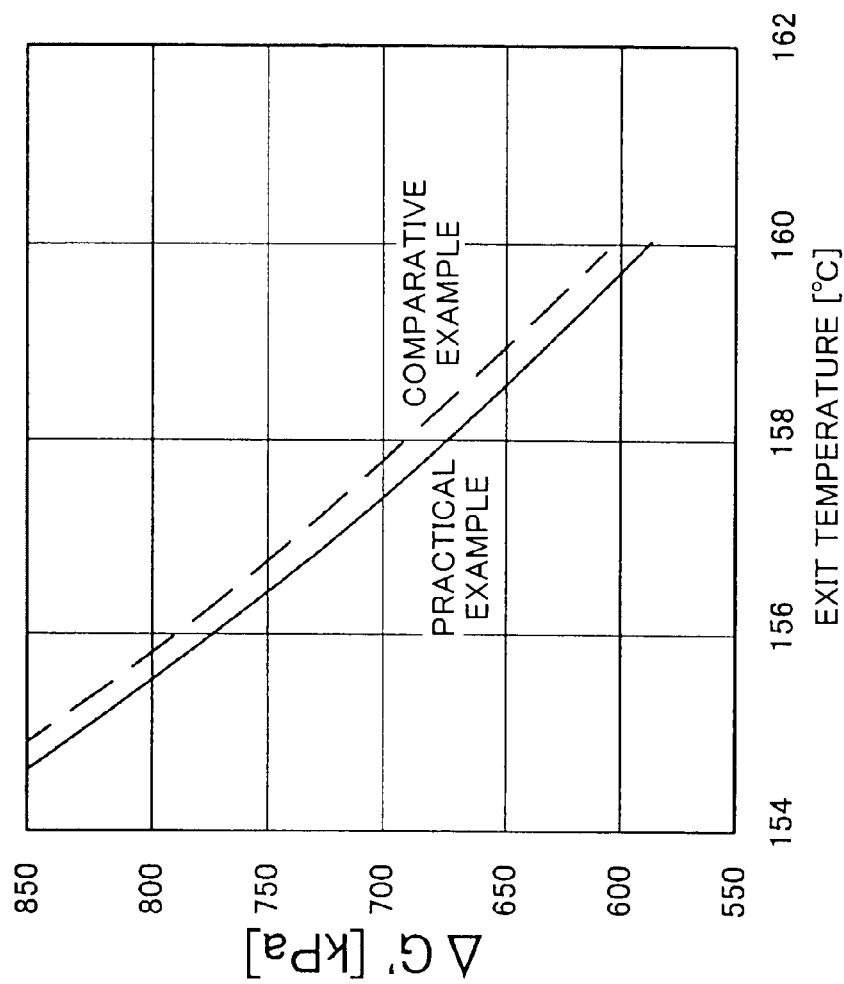
FIG. 19 is a graph showing the correlation between the exit temperature of the kneading material and the ΔG' value according to the present embodiment.

In FIG. 19, the kneading results when using the first kneading rotor 1 and the second kneading rotor 5 of the practical example described above are indicated by a solid line, and the kneading results when using kneading rotors according to the comparative example are indicated by a broken line. The vertical axis of the graph is the ΔG' value, and the horizontal axis is the temperature of the kneaded material (exit temperature) when discharged from the material discharge outlet 72.

As shown in FIG. 19, the results of the kneading experiment indicate that the AG' value relating to the practical example is lower than the ΔG' value in the comparative example, in the material temperature range of 155° C. to 160° C. From this result, according to the present example, it can be seen that the quality of the kneaded material is improved in comparison with the comparative example.

In the case of a material to be kneaded which combines silica, a silica coupling agent is combined in order to bind the silica and the rubber, and this silica coupling agent reacts with the silica in material temperature range of 140° C. to 160° C., for example, (high temperature range). Consequently, in order that the reaction between the silica and the silica coupling agent occurs efficiently, it is necessary to knead the silica and the silica coupling agent uniformly in the temperature range of approximately 140° C. to 160° C. Provided that the screw angle of the three kneading blades of the kneading rotor (the long blade, the medium blade and the short blade) is equal to or greater than 45 degrees and equal to or less than 61 degrees, then uniform kneading of the silica and the silica coupling agent is possible.

Furthermore, in the present practical example, silica is combined to the material to be kneaded, but even in the case of kneading a material to be kneaded which includes a large amount of other compounding agents (filler, or the like), satisfactory beneficial effects are obtained in respect of the dispersibility of the compounding agents, if the closed kneading machine comprising the kneading rotors according to the practical example is used.

Experiment 2

Next, the relationship between the extrusion output of the material during kneading in the axial direction D of the kneading rotor and the screw angle of the kneading blades was calculated. The material extrusion output is an indicator of the fluid characteristics of the material in the axial direction D of the kneading rotors in the closed kneading machine, and the greater this value, the higher the fluid characteristics and the more uniform the kneading of the material that can be achieved. The material extrusion output Q is expressed by the following equation.

$$Q = \alpha \cdot N - (\beta \cdot \Delta P/\mu) - (\gamma \Delta P/\mu)$$

Figure 20:
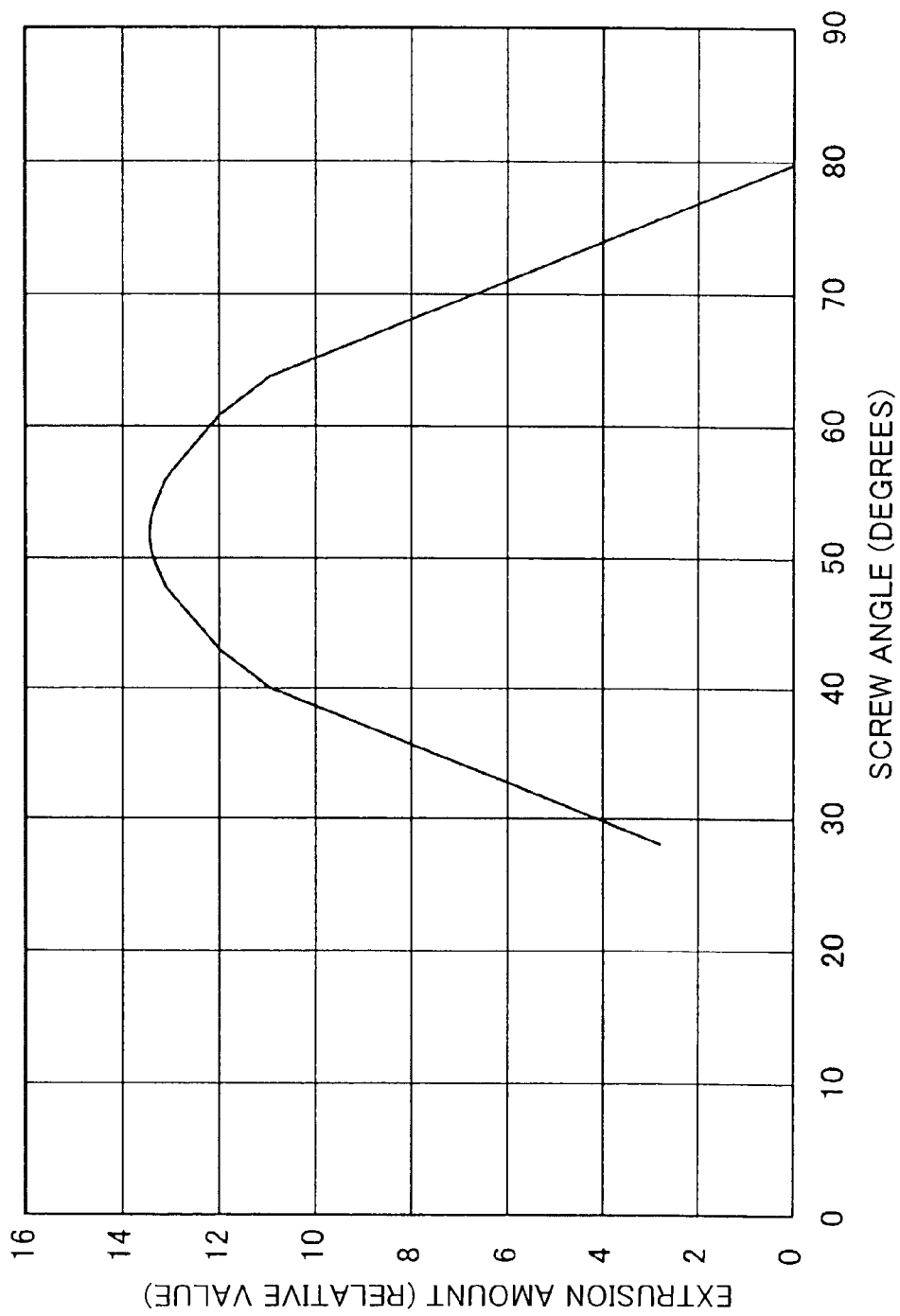
FIG. 20 is a graph showing the correlation between the screw angle of the blade of the kneading rotor and the extrusion output of kneaded material according to the present embodiment.

Q: material extrusion output
N: rotor rotating speed [$s^{-1}$]:
μ: viscosity [Pa·s]
ΔP: pressure change [Pa]
α, β, γ: coefficients relating to rotor shape FIG. 20 shows the results of calculation using the equation given above. In FIG. 20, the vertical axis indicates the relative value of the extrusion rate of the material, and the horizontal axis indicates the screw angle of the three kneading blades (long blade, medium blade and short blade). As shown in FIG. 20, the results of the experiment demonstrated that the material extrusion output becomes smaller if the screw angle of the kneading blades becomes too small or too large. Furthermore, in FIG. 20, it can also be seen that the material extrusion output is large when the screw angle of the kneading blades is in the range of 43° or greater and 61° or lower, and therefore the material fluidity properties become higher in this range. Moreover, it can also be seen that the material extrusion output is even larger when the screw angle of the kneading blades is in the range of 47° or greater and 57° or lower, and therefore the material fluidity properties become even higher in this range. The material extrusion output became a maximum when the screw angle of the kneading blades was in the vicinity of 50°.

Experiment 3

Next, a beads test was carried out using the closed kneading machine according to the present embodiment (Experiment 3). A beads test is an experiment in which a model material into which a large number of beads have been introduced is kneaded and the state of distribution (state of fluidity) of the beads in the material after kneading is evaluated. Furthermore, this experiment was carried out with the material kneading time respectively set to 30 seconds and 40 seconds.

In the present experiment, similarly to Experiment 1, a kneading experiment was carried out using kneading rotors having long blades which have a length in the direction of rotation F greater than one half the total length of the rotor sections 10, the long blades being arranged in such a manner that there are overlapping portions of the respective end portions of the long blades of the two kneading rotors, and having the same screw angles of the respective kneading blades of the kneading rotors with respect to the axial direction D as the screw angles of the respective kneading blades of the kneading rotors used in Experiment 1. In this kneading experiment, after kneading the model material containing beads inside the chambers, the interior of the chambers was divided into a plurality of regions of substantially the same volume, a prescribed amount of the model material was extracted respectively from each of these regions, and the number of beads contained in each of the model materials thus extracted was measured respectively. Thereupon, the average number and the standard deviation of the measured number of beads contained in the model material in each of the regions was calculated, and the value of standard deviation/average value was determined by dividing the standard deviation by the average value. The calculation results are shown in FIG. 21.

Figure 21:
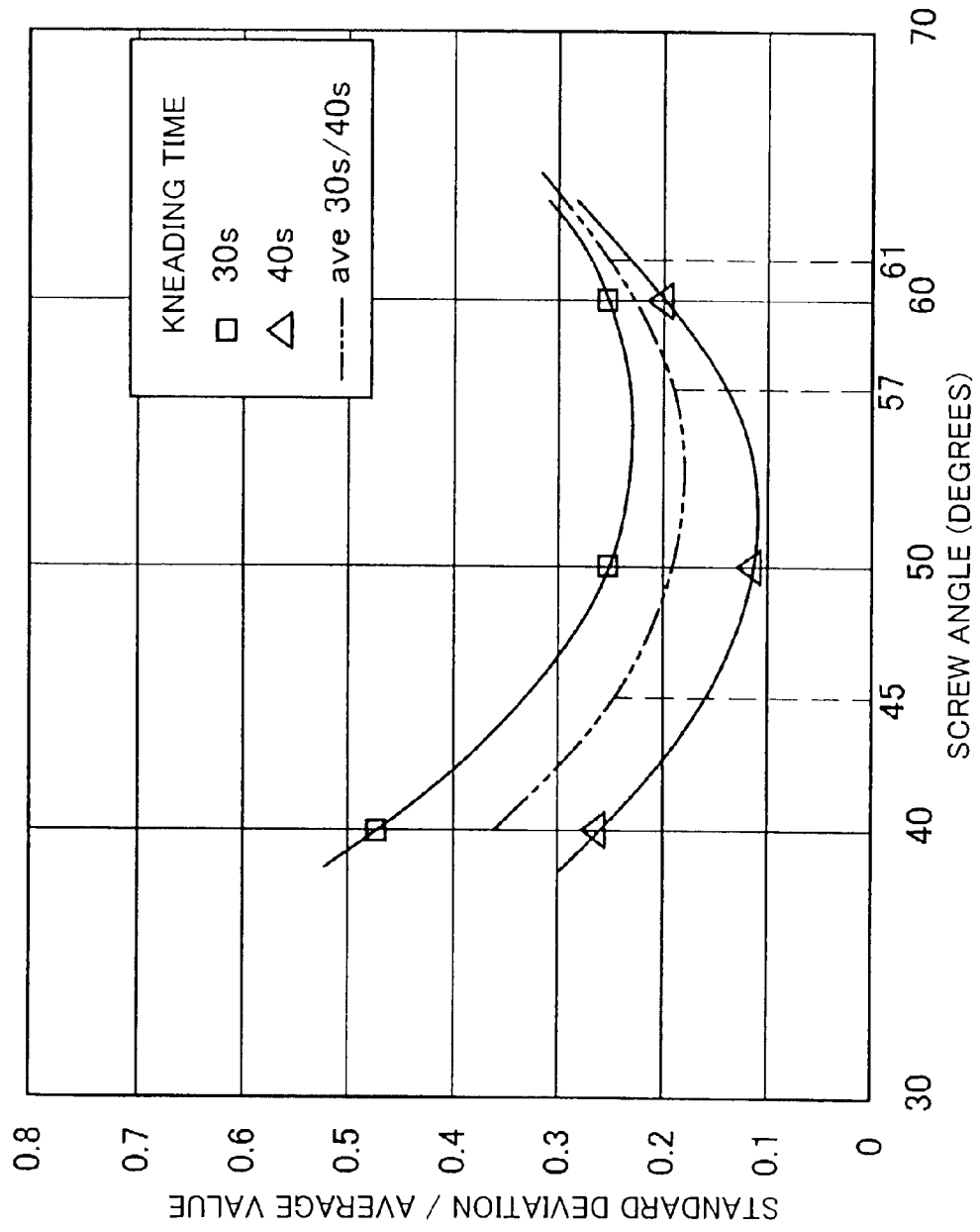
FIG. 21 is a graph showing the mixing properties with respect to the blade screw angle, as investigated by a beads test.

The vertical axis in FIG. 21 indicates the value of standard deviation/average value and the smaller this value, the more uniformly the beads are mixed into the model material. In other words, the smaller the value of standard deviation/average value, the better the evaluation which can be applied to the distribution performance and the mixing performance of the kneading rotors and the kneading machine comprising same. Furthermore, the horizontal axis in FIG. 21 indicates the screw angle of the three kneading blades (the long blade, the medium blade and the short blade). The double-dotted line "ave 30 s/40 s" in FIG. 21 represents the average value of "standard deviation/average value" when the kneading time is 30 seconds and "standard deviation/average value" when the kneading time is 40 seconds. This average value is found by deriving the arithmetic mean of the value of "standard deviation/average value" for a kneading time of 30 seconds and the value of "standard deviation/average value" for a kneading time of 40 seconds, respectively for different screw angles of the kneading blades. The value of "ave 30 s/40 s" is employed in evaluating the results of the experiment in order to assess the effects of the screw angles of the kneading blades of the kneading rotors while eliminating the effects due to the kneading time. From the results shown in FIG. 21, it can be seen that the value of standard deviation/average value becomes smaller when the screw angle of the kneading blades is equal to or greater than 45° and equal to or lower than 61°, and that the value of standard deviation/average value becomes dramatically smaller when the screw angle of the kneading blades is equal to or greater than 50° and equal to or lower than 57°. In other words, it can be seen that if the screw angle of the kneading blades is equal to or greater than 50° and equal to or lower than 57°, then a particularly marked effect in suppressing variation in the mixing properties of the kneading rotors is achieved.

Modification Example

Figure 22:
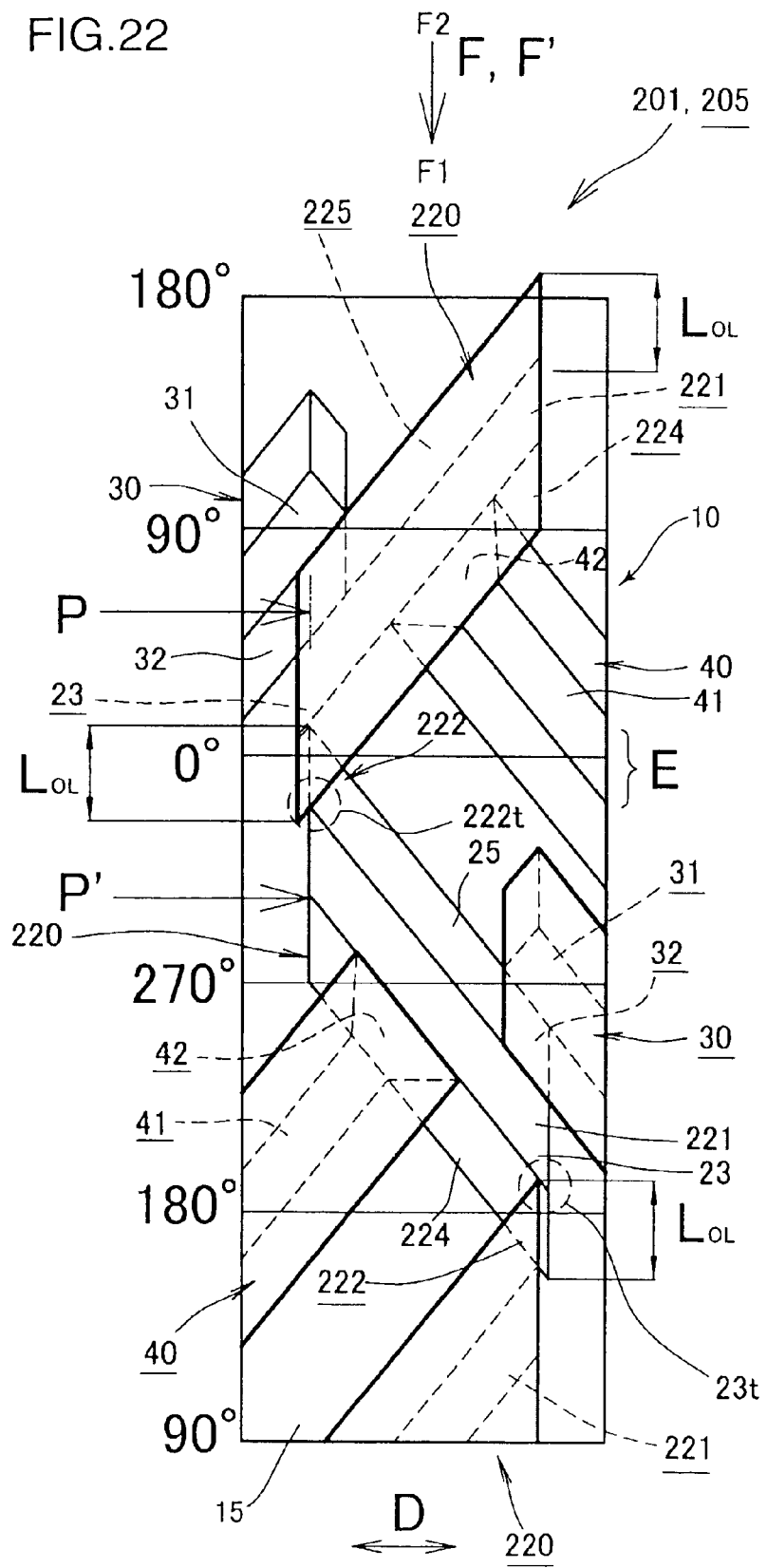
FIG. 22 is a superimposed projected diagram of the kneading sections of a pair of kneading rotors relating to a modification example.

Next, a modification example of the embodiment described above will be explained with reference to FIG. 22. In FIG. 22, portions which are similar to the embodiment described above are labeled with the same reference numerals as the corresponding portions of the embodiment described above. FIG. 22 is a superimposed projected diagram of a pair of kneading rotors according to this modification example. The description below centers on the portion which is different from the embodiment described above, and portions and elements which are similar to the embodiment described above are not explained here. In FIG. 22, the portions labeled with the reference numerals 201, 205, 220, 221, 222, 222t, 224 and 225 respectively correspond to the portions labeled with the reference numerals 1, 5, 20, 21, 22, 22t, 24 and 25 in the embodiment described above. Furthermore, in FIG. 22, the reference numerals of the portions included in the first kneading rotor 201 are not underlined, whereas the reference numerals of the portions included in the second kneading rotor 205 are underlined.

In the pair of kneading rotors according to the present modification example (the first kneading rotor 201 and the second kneading rotor 205), the shape of the long blade 220 is different to the shape of the long blade 20 according to the embodiment described above. More specifically, the shape of the second end section 23 which is the end section on the forward side in the direction of rotation of the kneading rotor, of the long blade 220, is similar to the shape of the second end section 23 of the long blade 20 according to the present embodiment, but the shape of the first end section 222 which is the end section on the rearward side in the direction of rotation of the kneading rotor, of the long blade 220, is different to the shape of the first end section 22 of the long blade 20 according to the embodiment described above. In other words, an inclined surface 29 is not formed on the first end section 222 of the long blade 220. Furthermore, the length of the long blade 220 in the axial direction D of the kneading rotor is shorter than the length of the long blade 20 according to the embodiment described above in the same direction. To give a more detailed explanation, in the first end section 222, the front end portion of the first end section 22 of the embodiment described above, including the inclined surface 29, is eliminated and the first end section 222 is shorter than the first end section 22 of the embodiment described above, by a corresponding amount. The kneading rotor may have a composition such as that of this modification example. The cross-sectional diagram of the kneading rotor at position P-P' in the FIG. 22 is similar to the cross-sectional diagram of the kneading rotor at position G-G' in the embodiment described above (FIG. 18).

Further Embodiments

The embodiments of the present invention are not limited to the embodiment and the modification example described above. For example, in the embodiment described above, the rotor shaft 10j and the rotor shaft 10k have different shapes, but these rotor shafts may also have the same shape. More specifically, the shape of the two rotor shafts which sandwich the rotor section 10 may have symmetrical shapes. According to a composition of this kind, it is possible to use the same type of kneading rotor for each of the pair of kneading rotors, by altering the arrangement direction only, and therefore the assembly time and the cost can be reduced.

Summary of Embodiments

A summary of the embodiment described above is as follows.

More specifically, the kneading rotor relating to the embodiment described above is a kneading rotor of an intermeshing type used in a closed kneading machine having a casing inside which a chamber is provided, comprising a rotor section which is provided in the chamber. The rotor section has a rotor section main body of a round cylindrical shape, and one long blade and two short blades provided on the surface of the rotor section main body. The length L4 of the long blade in the direction of rotation of the rotor section is greater than one half of the total length L5 of the rotor section main body in the direction of rotation. The ratio (L1/L2) between the length L1 of the long blade in the axial direction of the rotor section and the total length L2 of the rotor section main body in the axial direction is equal to or greater than 0.6 and less than 1, and the ratio (x/L2) between the distance x in the axial direction from one end of the long blade to the end of the rotor section main body, and the total length L2 of the rotor section main body in the axial direction is greater than 0, and equal to or less than 0.2. The two short blades are arranged in such a manner that, in a case where a pair of the rotor sections are arranged mutually in parallel inside the chamber of the closed kneading machine and are rotated in mutually opposite directions, the two short blades of one of the rotor sections alternately repeat an approaching action and a separating action in the direction of rotation of the rotor section with respect to the long blade of the other one of the rotor sections, and in the state of approach, the long blade of the other one of the rotor sections is sandwiched between the two short blades of the one of the rotor sections in the axial direction. The long blades are arranged in such a manner that, in a case where a pair of the rotor sections are arranged mutually in parallel inside the chamber of the closed kneading machine and are rotated in mutually opposite directions, an end section on the rearward side in the direction of rotation of the rotor section, of the long blade of one of the rotor sections, and an end section on the forward side in the direction of rotation of the rotor section, of the long blade of the other one of the rotor sections, alternately repeat mutually an approaching action and a separating action, and in the state of approach, the end section on the forward side and the end section on the rearward side oppose each other in the direction of rotation of the rotor sections on a line which links the respective central axes of the pair of rotor sections, in one cross-section perpendicular to the axial direction.

In this composition, the length L4 of the long blade in the direction of rotation of the rotor section is greater than one half of the total length L5 of the rotor section main body in the direction of rotation, and when the long blades of the pair of rotor sections approach each other, the respective end sections of the long blades oppose each other in the direction of rotation of the rotor section on the line linking the respective central axes of the pair of rotor sections, in other words, in a direction perpendicular to the line linking the respective central axes of the pair of rotor sections. Consequently, since the mutually opposing end sections of the long blades of the pair of rotor sections shut off the material leakage path in the chambers, it is possible to reduce or to eliminate leaking of material from the gap between the two end sections. Therefore, it is possible to raise the material shearing performance. Furthermore, generally, if the screw angle of the kneading blades is increased, the shearing properties are reduced, but in the present composition, it is possible to increase the material shearing properties by means of the end sections of the pair of long blades, as described above, and therefore it is possible to maintain high shearing properties even if the material fluidity properties are raised by increasing the screw angle of the long blade. As described above, according to the present composition, a kneading rotor having both excellent material fluidity properties and excellent material shearing properties is obtained.

Here, a "long blade" is a kneading blade in which the length in the axial direction of the rotor section of the central line of the tip section provided in the apex portion of the kneading blade is greater than one half of the total length L2 of the rotor section in the axial direction, and a "short blade" is a kneading blade in which the length in the axial direction of the rotor section of the central line of the tip section provided in the apex portion of the kneading blade is equal to or less than one half of the total length L2 of the rotor section in the axial direction.

The "one end of the long blade" means either end of the long blade in the lengthwise direction thereof. Furthermore, the distance from one end of the long blade to the end of the rotor section which is near the one end of the long blade and the distance from the other end of the long blade to the end of the rotor section which is near the other end of the long blade may be the same or different distances.

The "two short blades" provided in one rotor section may have the same length or different lengths in the axial direction of the rotor section.

The "closed kneading machine" kneads a material such as rubber, plastic, or the like, by a batch process.

The "chamber" is a kneading chamber which accommodates a kneading rotor. Kneading of the material is carried out by the kneading rotors inside the chamber.

Furthermore, in the state of approach, there should exist, at a certain position in the kneading rotor, one cross-section in which the end section on the rearward side and the end section on the forward side are mutually opposing in the direction of rotation of the rotor section on the line which links the central axes of the pair of rotor sections, and when the state of approach occurs in this one cross-section, there may exist in the kneading rotor a cross-section in which a state of approach of this kind does not occur, in other words, a cross-section in which the end section on the rearward side and the end section on the forward side are in a separated state.

In the kneading rotor described above, the long blade may have a screw angle equal to or greater than 45 degrees, and equal to or less than 61 degrees with respect to the axial direction.

By adopting a composition of this kind, it is possible to suppress variation in the mixing properties of the kneading rotors.

In this case, the long blade may have a screw angle equal to or greater than 50 degrees, and equal to or less than 57 degrees with respect to the axial direction.

By adopting a composition of this kind, it is possible further to suppress variation in the mixing properties of the kneading rotors.

More specifically, the closed kneading machine relating to the embodiment described above comprises: a casing in which a chamber is provided, a material supply port is provided in a position above the chamber, a material discharge port is provided in a position below the chamber, and the chamber is hermetically sealed by closing the material supply port and the material discharge port; and a pair of kneading rotors of an intermeshing type accommodated in the chamber and arranged mutually in parallel. The pair of kneading rotors respectively have a rotor section, and the rotor sections each has a rotor section main body of a round cylindrical shape, and one long blade and two short blades provided on the surface of the rotor section main body. In each of the rotor sections, the length L4 of the long blade in the direction of rotation of the rotor section is greater than one half of the total length L5 of the rotor section main body in the direction of rotation. In each of the rotor sections, the ratio (L1/L2) between the length L1 of the long blade in the axial direction of the rotor section and the total length L2 of the rotor section main body in the axial direction is equal to or greater than 0.6, and less than 1, and the ratio (x/L2) between the distance x in the axial direction from one end of the long blade to the end of the rotor section main body, and the total length L2 of the rotor section main body in the axial direction is greater than 0, and equal to or less than 0.2. The two short blades are arranged in such a manner that, in a case where the pair of rotor sections are rotated in mutually opposite directions, the two short blades of one of the rotor sections alternately repeat an approaching action and a separating action in the direction of rotation of the rotor section with respect to the long blade of the other one of the rotor sections, and in the state of approach, the long blade of the other one of the rotor sections is sandwiched between the two short blades of the one of the rotor sections in the axial direction. The long blades are arranged in such a manner that, in a case where the pair of rotor sections are rotated in mutually opposite directions, an end section on the rearward side in the direction of rotation of the rotor section, of the long blade of one of the rotor sections, and an end section on the forward side in the direction of rotation of the rotor section, of the long blade of the other one of the rotor sections, alternately repeat mutually an approaching action and a separating action, and in the state of approach, the end section on the forward side and the end section on the rearward side oppose each other in the direction of rotation of the rotor sections on a line which links the respective central axes of the pair of rotor sections, in one cross-section perpendicular to the axial direction.

In this composition, the length L4 of the long blade in the direction of rotation of the rotor section is greater than one half of the total length L5 of the rotor section main body in the direction of rotation, and when the long blades of the pair of rotor sections approach each other, the respective end sections of the long blades oppose each other in the direction of rotation of the rotor section on the line linking the respective central axes of the pair of rotor sections, in other words, in a direction perpendicular to the line linking the respective central axes of the pair of rotor sections. Consequently, since the mutually opposing end sections of the long blades of the pair of rotor sections shut off the material leakage path inside the chambers, it is possible to reduce or to eliminate leaking of material from the gap between the two end sections. Therefore, it is possible to raise the material shearing performance. Furthermore, generally, if the screw angle of the kneading blades is increased, the shearing properties are reduced, but in the present composition, it is possible to increase the material shearing properties by means of the end sections of the pair of long blades, as described above, and therefore it is possible to maintain high shearing properties even if the fluidity properties are raised by increasing the screw angle of the long blade. As described above, according to the present composition, a closed kneading machine having both excellent material fluidity properties and excellent material shearing properties is obtained.

The meanings of "long blade", "one end of the long blade", "two short blades", "closed kneading machine", "chamber" and "one cross-section" are the same as the description given above and are therefore further explanation thereof is omitted here.

Furthermore, the kneading rotor relating to the embodiment described above is a kneading rotor of an intermeshing type used in a closed kneading machine having a casing inside which a chamber is provided, comprising a rotor section which is provided in the chamber. The rotor section has a rotor section main body of a round cylindrical shape, and one long blade and two short blades provided on the surface of the rotor section main body. The length L4 of the long blade in the direction of rotation of the rotor section is greater than one half of the total length L5 of the rotor section main body in the direction of rotation. The ratio (L1/L2) between the length L1 of the long blade in the axial direction of the rotor section and the total length L2 of the rotor section main body in the axial direction is equal to or greater than 0.6, and less than 1, and the ratio (x/L2) between the distance x in the axial direction from one end of the long blade to the end of the rotor section main body, and the total length L2 of the rotor section main body in the axial direction is greater than 0 and equal to or less than 0.2. The two short blades are arranged in such a manner that, in a case where a pair of the rotor sections are arranged mutually in parallel inside the chamber of the closed kneading machine and are rotated in mutually opposite directions, the two short blades of one of the rotor sections alternately repeat an approaching action and a separating action in the direction of rotation of the rotor section with respect to the long blade of the other one of the rotor sections, and in the state of approach, the long blade of the other one of the rotor sections is sandwiched between the two short blades of the one of the rotor sections in the axial direction. The long blades are arranged in such a manner that in a case where a pair of the rotor sections are arranged mutually in parallel inside the chamber of the closed kneading machine and are rotated in mutually opposite directions, an end section on the rearward side in the direction of rotation of the rotor section, of the long blade of one of the rotor sections, and an end section on the forward side in the direction of rotation of the rotor section, of the long blade of the other one of the rotor sections, alternately repeat mutually an approaching action and a separating action, and in the state of approach, the distance D1 between the central axis of the one of the rotor sections and the front end of the long blade of that rotor section, the distance D2 between the central axis of the other one of the rotor sections and the front end of the long blade of that rotor section, and the distance D3 between the respective central axes of the pair of rotor sections satisfy the relationship D1+D2>D3 in the direction linking the respective central axes of the pair of rotor sections, in one cross-section perpendicular to the axial direction.

In this composition, the length L4 of the long blade in the direction of rotation of the rotor section is greater than one half of the total length L5 of the rotor section main body in the direction of rotation, and furthermore, the distances D1, D2 and D3 in the direction linking the respective central axes of the pair of rotor sections satisfy the relationship D1+D2>D3. Therefore, in the superimposed projected diagrams of the pair of kneading rotors, a mutually overlapping portion is produced in the direction of rotation of the rotor sections between the end portions of the long blades of the pair of kneading rotors. In other words, in the superimposed projected diagram of the pair of kneading rotors, a portion occurs where the front end of the long blade which is disposed to the rearward side in the direction of rotation of the rotor section is positioned to the forward side of the rear end of the long blade which is disposed to the forward side in the direction of rotation of the rotor section. Consequently, since the mutually opposing end sections of the long blades of the pair of rotor sections shut off the material leakage path inside the chambers, it is possible to reduce or to eliminate leaking of material from the gap between the two end sections. Therefore, it is possible to raise the material shearing performance. Furthermore, generally, if the screw angle of the kneading blades is increased, the shearing properties are reduced, but in the present composition, it is possible to increase the material shearing properties by means of the end sections of the pair of long blades, as described above, and therefore it is possible to maintain high shearing properties even if the material fluidity properties are raised by increasing the screw angle of the long blade. As described above, according to the present composition, kneading rotors having both excellent material fluidity properties and excellent material shearing properties are obtained.

The meanings of "long blade", "one end of the long blade", "two short blades", "closed kneading machine", "chamber" and "one cross-section" are the same as the description given above and are therefore further explanation thereof is omitted here.

Furthermore, the closed kneading machine relating to the embodiment described above comprises: a casing in which a chamber is provided, a material supply port is provided in a position above the chamber, a material discharge port is provided in a position below the chamber, and the chamber is hermetically sealed by closing the material supply port and the material discharge port; and a pair of kneading rotors of an intermeshing type accommodated in the chamber and arranged mutually in parallel. The pair of kneading rotors respectively have a rotor section, and the rotor sections each has a rotor section main body of a round cylindrical shape, and one long blade and two short blades provided on the surface of the rotor section main body. In each of the rotor sections, the length L4 of the long blade in the direction of rotation of the rotor section is greater than one half of the total length L5 of the rotor section main body in the direction of rotation. In each of the rotor sections, the ratio (L1/L2) between the length L1 of the long blade in the axial direction of the rotor section and the total length L2 of the rotor section main body in the axial direction is equal to or greater than 0.6, and less than 1, and the ratio (x/L2) between the distance x in the axial direction from one end of the long blade to the end of the rotor section main body, and the total length L2 of the rotor section in the axial direction is greater than 0 and equal to or less than 0.2. The two short blades are arranged in such a manner that, in a case where the pair of rotor sections are rotated in mutually opposite directions, the two short blades of one of the rotor sections alternately repeat an approaching action and a separating action in the direction of rotation of the rotor section with respect to the long blade of the other one of the rotor sections, and in the state of approach, the long blade of the other one of the rotor sections is sandwiched between the two short blades of the one of the rotor sections in the axial direction; and the long blades are arranged in such a manner that, in a case where the pair of rotor sections are rotated in mutually opposite directions, an end section on the rearward side in the direction of rotation of the rotor section, of the long blade of one of the rotor sections, and an end section on the forward side in the direction of rotation of the rotor section, of the long blade of the other one of the rotor sections, alternately repeat mutually an approaching action and a separating action, and in the state of approach, the distance D1 between the central axis of one of the rotor sections and the front end of the long blade of that rotor section, the distance D2 between the central axis of the other one of the rotor sections and the front end of the long blade of that rotor section, and the distance D3 between the respective central axes of the pair of rotor sections satisfy the relationship D1+D2>D3 in the direction linking the respective central axes of the pair of rotor sections, in one cross-section perpendicular to the axial direction.

In this composition, the length L4 of the long blade in the direction of rotation of the rotor section is greater than one half of the total length L5 of the rotor section main body in the direction of rotation, and furthermore, the distances D1, D2 and D3 in the direction linking the respective central axes of the pair of rotor sections satisfy the relationship D1+D2>D3. Therefore, in the superimposed projected diagrams of the pair of kneading rotors, a mutually overlapping portion is produced in the direction of rotation of the rotor sections between the end portions of the long blades of the pair of kneading rotors. In other words, in the superimposed projected diagram of the pair of kneading rotors, a portion occurs where the front end of the long blade which is disposed to the rearward side in the direction of rotation of the rotor section is positioned to the forward side of the rear end of the long blade which is disposed to the forward side in the direction of rotation of the rotor section. Consequently, since the mutually opposing end sections of the long blades of the pair of rotor sections shut off the material leakage path in the chambers, it is possible to reduce or to eliminate leaking of material from the gap between the two end sections. Therefore, it is possible to raise the material shearing performance. Furthermore, generally, if the screw angle of the kneading blades is increased, the shearing properties are reduced, but in the present composition, it is possible to increase the material shearing properties by means of the end sections of the pair of long blades, as described above, and therefore it is possible to maintain high shearing properties even if the material fluidity properties are raised by increasing the screw angle of the long blade. As described above, according to the present composition, a closed kneading machine having both excellent material fluidity properties and excellent material shearing properties is obtained.

The meanings of "long blade", "one end of the long blade", "two short blades", "closed kneading machine", "chamber" and "one cross-section" are the same as the description given above and are therefore further explanation thereof is omitted here.

INDUSTRIAL APPLICABILITY

The present invention can be used in a closed kneading machine for kneading a material, such as rubber.

The invention claimed is:

1. A kneading rotor of an intermeshing type used in a closed kneading machine having a casing inside which a chamber is provided, comprising a rotor section which is provided in the chamber, wherein;

the rotor section has a rotor section main body of a round cylindrical shape, and one long blade and two short blades provided on a surface of the rotor section main body;

the length L4 of the long blade in a direction of rotation of the rotor section is greater than one half of the total length L5 of the rotor section main body in the direction of rotation, the ratio (L1/L2) between the length L1 of the long blade in an axial direction of the rotor section and the total length L2 of the rotor section main body in the axial direction is equal to or greater than 0.6, and less than 1, and the ratio (x/L2) between the distance x in the axial direction from one end of the long blade to an end of the rotor section main body and the total length L2 of the rotor section main body in the axial direction is greater than 0, and equal to or less than 0.2, the two short blades are arranged in such a manner that, in a case where a pair of the rotor sections are arranged mutually in parallel inside the chamber of the closed kneading machine and are rotated in mutually opposite directions, the two short blades of one of the rotor sections alternately repeat an approaching action and a separating action, in the direction of rotation of the rotor section, with respect to the long blade of the other one of the rotor sections, and in the state of approach, the long blade of the other one of the rotor sections is sandwiched between the two short blades of the one of the rotor sections in the axial direction, and the long blade is arranged in such a manner that, in a case where a pair of the rotor sections are arranged mutually in parallel inside the chamber of the closed kneading machine and are rotated in mutually opposite directions, an end section on the rearward side in the direction of rotation of the rotor section, of the long blade of one of the rotor sections, and an end section on the forward side in the direction of rotation of the rotor section, of the long blade of the other one of the rotor sections, alternately repeat mutually an approaching action and a separating action, and in the state of approach, the end section on the forward side and the end section on the rearward side oppose each other in the direction of rotation of the rotor sections on a line which links the respective central axes of the pair of rotor sections, in one cross-section perpendicular to the axial direction.

2. The kneading rotor according to claim 1, wherein the long blade has a screw angle equal to or greater than 45 degrees, and equal to or less than 61 degrees with respect to the axial direction.

3. The kneading rotor according to claim 2, wherein the long blade has a screw angle equal to or greater than 50 degrees, and equal to or less than 57 degrees with respect to the axial direction.

4. A closed kneading machine, comprising:
a casing in which a chamber is provided, a material supply port is provided in a position above the chamber, a material discharge port is provided in a position below the chamber, and the chamber is hermetically sealed by closing the material supply port and the material discharge port; and a pair of kneading rotors of an intermeshing type accommodated in the chamber and arranged mutually in parallel, wherein the pair of kneading rotors respectively have a rotor section;

the rotor sections each has a rotor section main body of a round cylindrical shape, and one long blade and two short blades provided on a surface of the rotor section main body;

in each of the rotor sections, the length L4 of the long blade in a direction of rotation of the rotor section is greater than one half of the total length L5 of the rotor section main body in the direction of rotation;

in each of the rotor sections, the ratio (L1/L2) between the length L1 of the long blade in an axial direction of the rotor section and the total length L2 of the rotor section main body in the axial direction is equal to or greater than 0.6, and less than 1, and the ratio (x/L2) between the distance x in the axial direction from one end of the long blade to an end of the rotor section main body and the total length L2 of the rotor section main body in the axial direction is greater than 0, and equal to or less than 0.2;

the two short blades are arranged in such a manner that, in a case where the pair of rotor sections are rotated in mutually opposite directions, the two short blades of one of the rotor sections alternately repeat an approaching action and a separating action in the direction of rotation of the rotor section with respect to the long blade of the other one of the rotor sections, and in the state of approach, the long blade of the other one of the rotor sections is sandwiched between the two short blades of the one of the rotor sections in the axial direction; and the long blade is arranged in such a manner that, in a case where the pair of rotor sections are rotated in mutually opposite directions, an end section on the rearward side in the direction of rotation of the rotor section, of the long blade of one of the rotor sections, and an end section on the forward side in the direction of rotation of the rotor section, of the long blade of the other one of the rotor sections, alternately repeat mutually an approaching action and a separating action, and in the state of approach, the end section on the forward side and the end section on the rearward side oppose each other in the direction of rotation of the rotor sections on a line which links the respective central axes of the pair of rotor sections, in one cross-section perpendicular to the axial direction.

5. A kneading rotor of an intermeshing type used in a closed kneading machine having a casing inside which a chamber is provided, comprising a rotor section which is provided in the chamber, wherein;

the rotor section has a rotor section main body of a round cylindrical shape, and one long blade and two short blades provided on a surface of the rotor section main body;

the length L4 of the long blade in a direction of rotation of the rotor section is greater than one half of the total length L5 of the rotor section main body in the direction of rotation;

the ratio (L1/L2) between the length L1 of the long blade in an axial direction of the rotor section and the total length L2 of the rotor section main body in the axial direction is equal to or greater than 0.6, and less than 1, and the ratio (x/L2) between the distance x in the axial direction from one end of the long blade to an end of the rotor section main body and the total length L2 of the rotor section main body in the axial direction is greater than 0 and equal to or less than 0.2;

the two short blades are arranged in such a manner that, in a case where a pair of the rotor sections are arranged mutually in parallel inside the chamber of the closed kneading machine and are rotated in mutually opposite directions, the two short blades of one of the rotor sections alternately repeat an approaching action and a separating action in the direction of rotation of the rotor section with respect to the long blade of the other one of the rotor sections, and in the state of approach, the long blade of the other one of the rotor sections is sandwiched between the two short blades of the one of the rotor sections in the axial direction; and the long blade is arranged in such a manner that, in a case where a pair of the rotor sections are arranged mutually in parallel inside the chamber of the closed kneading machine and are rotated in mutually opposite directions, an end section on the rearward side in the direction of rotation of the rotor section, of the long blade of one of the rotor sections, and an end section on the forward side in the direction of rotation of the rotor section, of the long blade of the other one of the rotor sections, alternately repeat mutually an approaching action and a separating action, and in the state of approach, the distance D1 between the central axis of one of the rotor sections and the front end of the long blade of that rotor section, the distance D2 between the central axis of the other one of the rotor sections and the front end of the long blade of that rotor section, and the distance D3 between the respective central axes of the pair of rotor sections satisfy the relationship D1+D2>D3 in a direction linking the respective central axes of the pair of rotor sections, in one cross-section perpendicular to the axial direction.

6. A closed kneading machine, comprising:

a casing in which a chamber is provided, a material supply port is provided in a position above the chamber, a material discharge port is provided in a position below the chamber, and the chamber is hermetically sealed by closing the material supply port and the material discharge port; and a pair of kneading rotors of an intermeshing type accommodated in the chamber and arranged mutually in parallel, wherein the pair of kneading rotors respectively have a rotor section;

the rotor sections each has a rotor section main body of a round cylindrical shape, and one long blade and two short blades provided on a surface of the rotor section main body;

in each of the rotor sections, the length L4 of the long blade in a direction of rotation of the rotor section is greater than one half of the total length L5 of the rotor section main body in the direction of rotation;

in each of the rotor sections, the ratio (L1/L2) between the length L1 of the long blade in an axial direction of the rotor section and the total length L2 of the rotor section main body in the axial direction is equal to or greater than 0.6, and less than 1, and the ratio (x/L2) between the distance x in the axial direction from one end of the long blade to an end of the rotor section main body, and the total length L2 of the rotor section in the axial direction is greater than 0 and equal to or less than 0.2;

the two short blades are arranged in such a manner that, in a case where the pair of rotor sections are rotated in mutually opposite directions, the two short blades of one of the rotor sections alternately repeat an approaching action and a separating action in a direction of rotation of the rotor section with respect to the long blade of the other one of the rotor sections, and in the state of approach, the long blade of the other one of the rotor sections is sandwiched between the two short blades of the one of the rotor sections in the axial direction; and the long blade is arranged in such a manner that, in a case where the pair of rotor sections are rotated in mutually opposite directions, an end section on the rearward side in a direction of rotation of the rotor section, of the long blade of one of the rotor sections, and an end section on the forward side in the direction of rotation of the rotor section, of the long blade of the other one of the rotor sections, alternately repeat mutually an approaching action and a separating action, and in the state of approach, the distance D1 between the central axis of one of the rotor sections and the front end of the long blade of that rotor section, the distance D2 between the central axis of the other one of the rotor sections and the front end of the long blade of that rotor section, and the distance D3 between the respective central axes of the pair of rotor sections satisfy the relationship D1+D2>D3 in a direction linking the respective central axes of the pair of rotor sections, in one cross-section perpendicular to the axial direction.

* * * * *